United States Patent [19]
Mukai et al.

[11] Patent Number: 5,659,823
[45] Date of Patent: Aug. 19, 1997

[54] CAMERA

[75] Inventors: Hiromu Mukai; Yasuo Maeda, both of Kawachinagano; Shigeto Ohmori; Hiroshi Ootsuka, both of Sakai, all of Japan

[73] Assignee: Minolta Camera Kabushiki Kaisha, Osaka, Japan

[21] Appl. No.: 365,330

[22] Filed: Dec. 28, 1994

Related U.S. Application Data

[63] Continuation of Ser. No. 43,601, Apr. 5, 1993, which is a continuation of Ser. No. 751,114, Aug. 28, 1991.

[30] Foreign Application Priority Data

Aug. 29, 1990 [JP] Japan ................................ 2-230882
Aug. 29, 1990 [JP] Japan ................................ 2-230883

[51] Int. Cl.⁶ ........................................ G03B 17/18
[52] U.S. Cl. ................................ 396/291; 396/297
[58] Field of Search ........................ 354/403, 409, 354/471, 472, 473, 474, 475, 289.1

[56] References Cited

U.S. PATENT DOCUMENTS

| | | | |
|---|---|---|---|
| 4,315,674 | 2/1982 | Hosoe et al. | 354/25 |
| 4,354,754 | 10/1982 | Takahashi et al. | 354/289 |
| 4,391,500 | 7/1983 | Tsunekawa | 354/31 |
| 4,465,355 | 8/1984 | Murakami et al. | 354/475 |
| 4,589,031 | 5/1986 | Tsuji | 358/227 |
| 4,597,659 | 7/1986 | Suda et al. | 354/405 |
| 4,609,274 | 9/1986 | Iwashita et al. | 354/442 |
| 4,629,305 | 12/1986 | Sato et al. | 354/442 |
| 4,710,008 | 12/1987 | Tosaka et al. | 354/475 |
| 4,717,936 | 1/1988 | Shimizu | 354/474 |
| 4,814,812 | 3/1989 | Nakajima et al. | 354/442 |
| 4,827,303 | 5/1989 | Tusboi | 354/403 |
| 4,837,596 | 6/1989 | Kawamura | 354/442 |
| 4,994,843 | 2/1991 | Kitazawa | 354/49 |
| 5,014,083 | 5/1991 | Izumi et al. | 354/471 |
| 5,130,742 | 7/1992 | Miyamoto et al. | 354/475 |
| 5,227,833 | 7/1993 | Ishida et al. | 354/195.13 |
| 5,264,889 | 11/1993 | Ishida et al. | 354/402 |
| 5,280,320 | 1/1994 | Kobayashi et al. | 354/471 |
| 5,363,169 | 11/1994 | Ishida et al. | 354/474 |

*Primary Examiner*—Russell E. Adams
*Attorney, Agent, or Firm*—Burns, Doane Swecker & Mathis, LLP

[57] ABSTRACT

A camera includes a manually operable member having a plurality of distance measuring areas and for switching between exposure correction and AF area and between single photographing and continuous photographing. A viewfinder of the camera displays not only an object but also the above-described respective functions displayed on a LCD and switchable by the manually operable member. As a result, a photographer is allowed to perform photographing while looking at not only the object but also the state of the various functions displayed on the LCD in the finder.

25 Claims, 22 Drawing Sheets

CAMERA

This application is a continuation of application Ser. No. 08/043,601, filed Apr. 5, 1993, which is a continuation of application Ser. No. 07/751,114, filed Aug. 28, 1991.

BACKGROUND OF THE INVENTION

1. Field of the Invention

The present invention relates generally to cameras, and more particularly, to cameras having a manually settable parameter determining the photographing operations by an operation of a manually operable member.

2. Description of the Prior Art

The cameras have been developed which are capable of displaying such photographing conditions as focus condition of a lens together with object image in a finder frame. Such camera is practical because a photographer is allowed to easily check photographing conditions while looking into the finder.

In the above-described conventional camera, photographing conditions displayed in the finder frame are fixed or static without representing the contents which a photographer wishes to willingly set at the time of photographing. The contents of the photographing conditions such as an exposure compensation amount, a film sensitivity, a drive mode and an AF area can be manually set by a photographer at will according to a state of object image displayed in the finder frame at that time and according to photographing he aims at based on the state. Although a conventional camera allows a photographer to check photographing conditions together with object image with ease while photographing, the camera does not allow the photographer to set the contents of various photographing conditions as described above while looking at the object image in the finder frame.

SUMMARY OF THE INVENTION

An object of the present invention is to provide a camera allowing a photographer to set the contents of a parameter determining photographing conditions with ease by operating a manually operable member while looking into a finder frame.

Another object of the present invention is to provide a camera allowing a photographer to set appropriate photographing conditions according to photographing he aims at while checking the status of object image in a finder frame by operating a manually operable member.

Still another object of the present invention is to provide a camera allowing a photographer to find with ease the contents of arbitrarily settable photographing conditions by operating a manually operable member while checking object image in a finder frame.

Still further object of the present invention is to provide a camera allowing a photographer to find the functions of a manually operable member provided in the camera while looking into a finder frame.

Still further object of the present invention is to provide a camera allowing a photographer to find the functions of a manually operable member which are available at that time while looking into a finder frame.

Still further object of the present invention is to provide a camera allowing a photographer to selectively set, with ease, the contents of a plurality of parameters for determining photographing conditions by operating a manually operable member.

Still further object of the present invention is to provide a camera allowing a photographer to quickly select and set the contents of a plurality of parameters for determining photographing conditions by operating a manually operable member.

Still further object of the present invention is to, in a camera having a plurality of settable parameters for determining photographing conditions, reduce the number of manually operable members provided for such setting operation.

The above-described objects of the present invention can be achieved by a camera having at least one manually settable parameter for determining operations of the camera which includes the following elements. More specifically, the camera according to the present invention has at least one manually settable parameter determining operations of the camera and includes a manually operable member for setting data of at least one parameter, a viewfinder, and a display device for displaying a function of the manually operable member inside of a frame delineating a field of view in the viewfinder.

The camera including the above-described elements enables display, in a finder frame, functions of the manually operable member for setting at least one parameter for determining camera operations. As a result, a photographer is allowed to set the contents of the parameter determining photographing conditions with ease while looking into the finder frame.

According to another aspect of the present invention, a camera having a plurality of manually settable parameters for determining camera operations includes a device for selecting at least one of the parameters, a manually operable member for setting data of the parameter selected by the selecting device, a viewfinder, a display device for displaying a plurality of functions of the manually operable member inside of a frame delineating a field of view in the viewfinder, and a device responsive to the selecting device for controlling the display device to display only the function of the manually operable member relating to the selected parameter.

With the camera including the above described elements, only the function relating to a manually settable parameter among a plurality of parameters is displayed. As a result, it is possible to provide a camera allowing a photographer to find the contents of arbitrarily settable photographing conditions with ease by operating the manually operable member while checking object image in the finder frame.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a flow chart explaining interruption processing when a photographing preparation switch or a function button is turned on.

FIGS. 10A and 10B are flow charts explaining operation procedure when the function button is switched from off to on.

DESCRIPTION OF THE PREFERRED EMBODIMENTS

Figure 1:
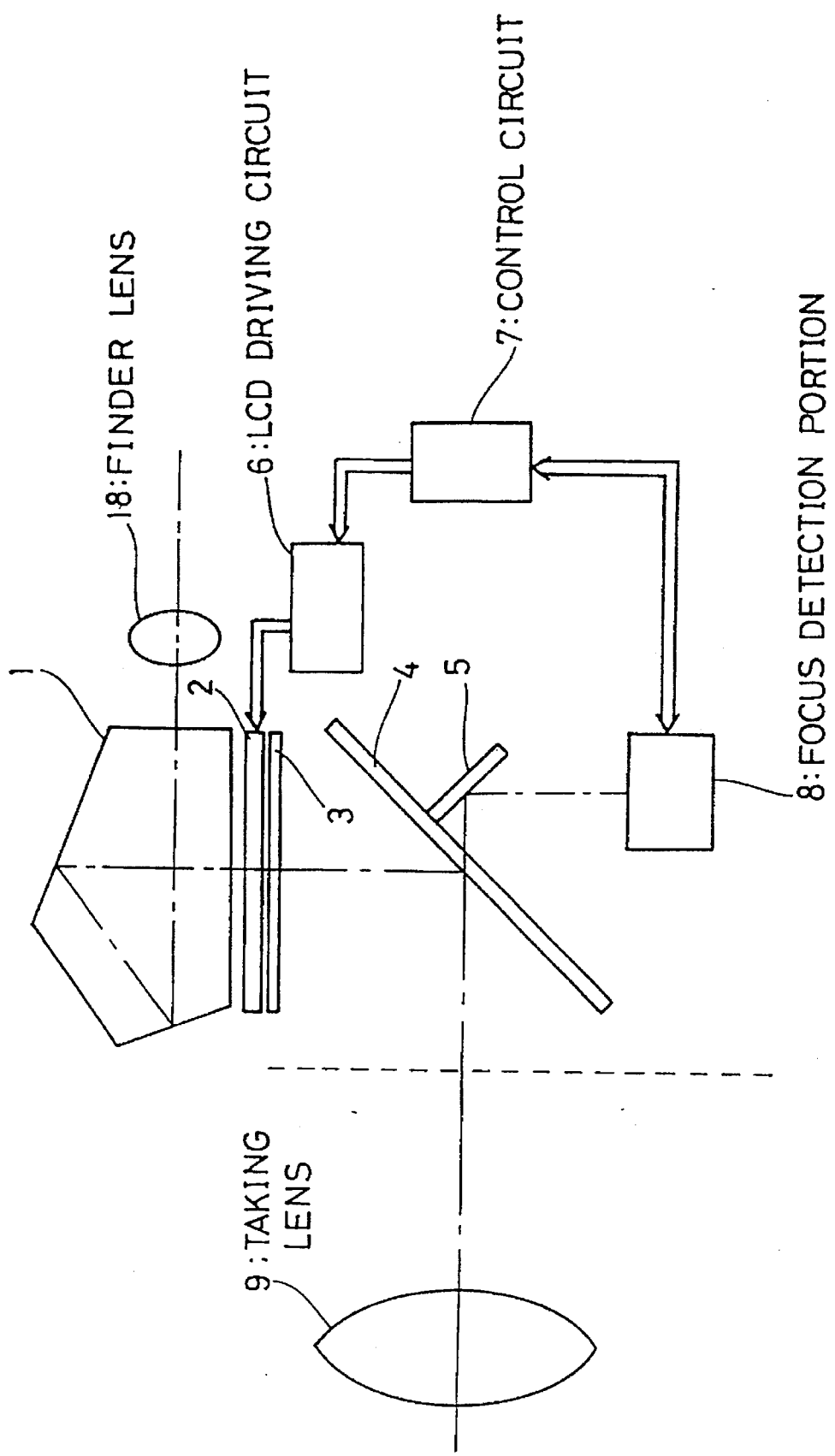
FIG. 1 is a diagram showing an arrangement of a main part of a camera according to one embodiment of the present invention.

With reference to FIG. 1, an incident light through a taking lens 9 is reflected by a finder mirror 4 and then, enters a penta prism 1 through a focusing screen 3 and a transparent liquid crystal display (LCD) 2 to reach a finder lens 18. Out of the incident light upon the finder mirror 4, part of the light required for focus detection passes through the mirror 4 and then it is reflected by a submirror 5 to enter a focus detection portion 8. The focus detection portion 8 includes an optical system necessary for focus detection and a sensor and data output portion and the like. The data output from the focus detection portion 8 is input to a control circuit 7. The control circuit 7 outputs data for controlling a focus detection sensor, and a LCD driving circuit 6 based on the input data. Further, the control circuit 7 controls the total operation of the camera and the calculation for focus detection. The LCD driving circuit 6 controls the transparent liquid crystal display 2 based on the control data output from the control circuit 7 to make various displays by liquid crystal.

Figure 2:
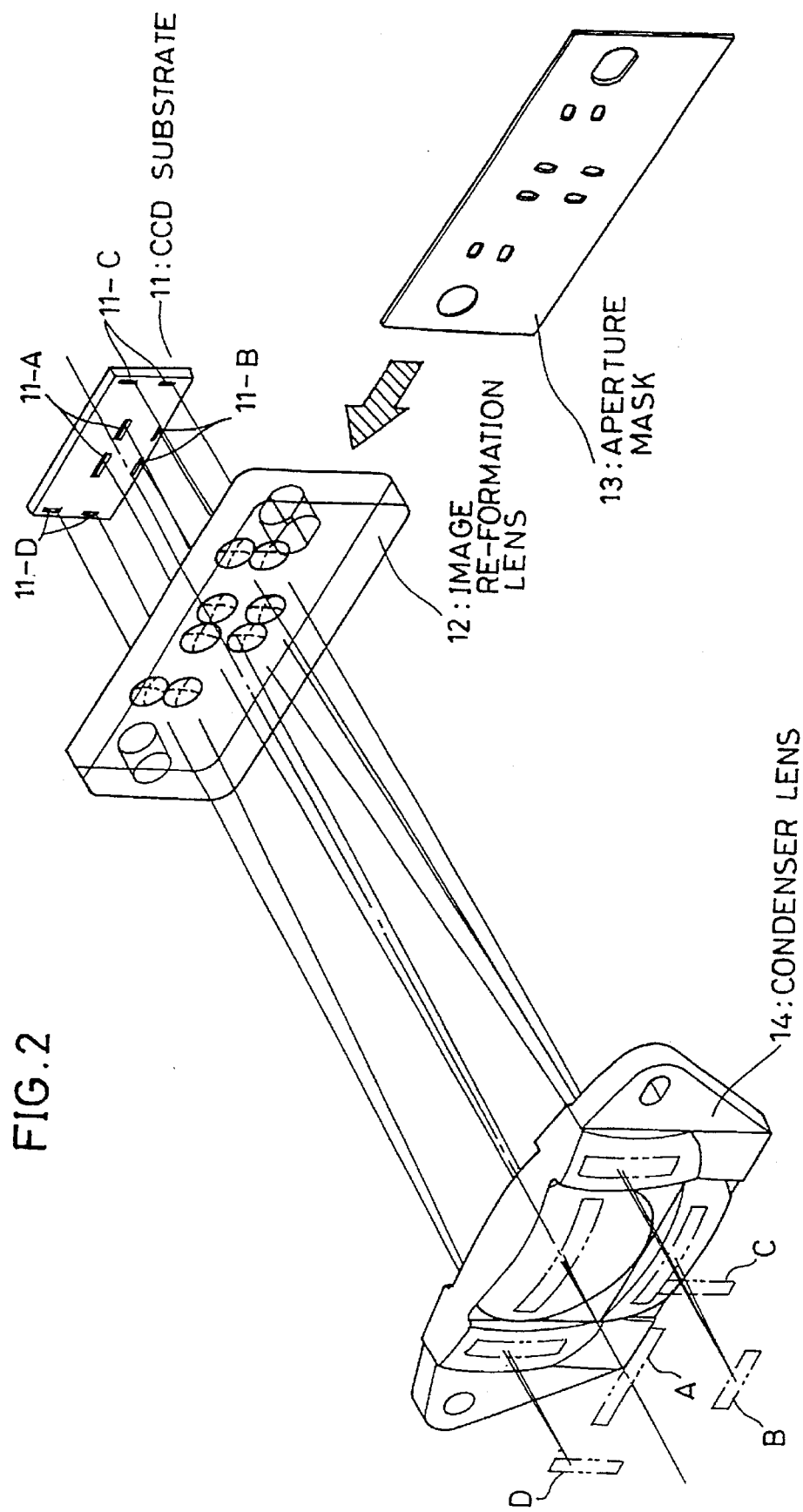
FIG. 2 is a diagram showing a specific arrangement of a focus detecting area detection portion of FIG. 1.

With reference to FIG. 2, the light reflected by the submirror 5 passes through a condenser lens 14 and divided into four bundles of rays by an image-reformation lens. The bundles of rays form image on a CCD substrate 11. The auto focus (referred to as "AF" hereinafter) system in the present embodiment is a well-known phase difference detecting method. An aperture mask 13 is set to overlap with an image re-formation lens 12 and the apertures of the aperture mask eliminate the unnecessary light for focus detection coming from the condenser lens 14. Formed on the CCD substrate 11 are the respective pairs of line sensors 11-A, 11-B, 11-C and 11-D corresponding to the four focus detecting areas a, b, c and d which will be described later.

Figure 3:
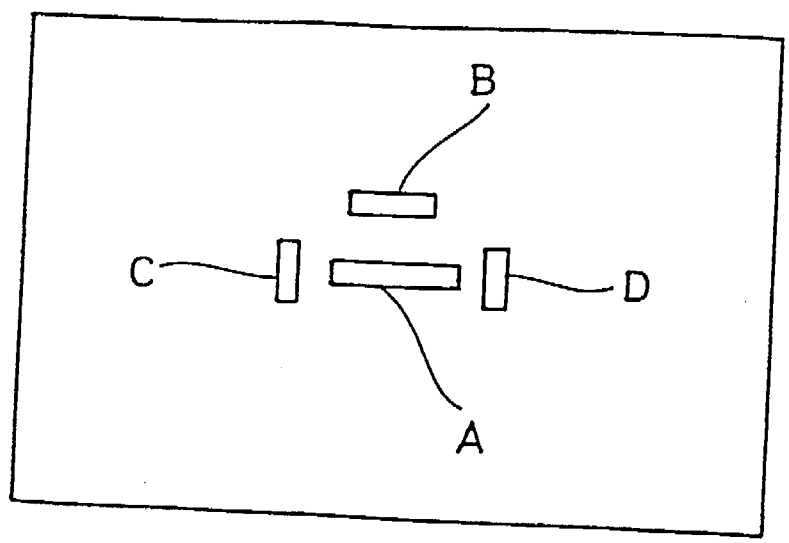
FIG. 3 is a diagram showing an arrangement of focus.

FIG. 3 is a diagram showing a state of an image area to be photographed of a camera according to one embodiment of the present invention.

In the drawing, the focus detecting areas corresponding to the respective line sensors formed on the CCD substrate 11 of FIG. 2 are shown in an image area 15.

Figure 4:
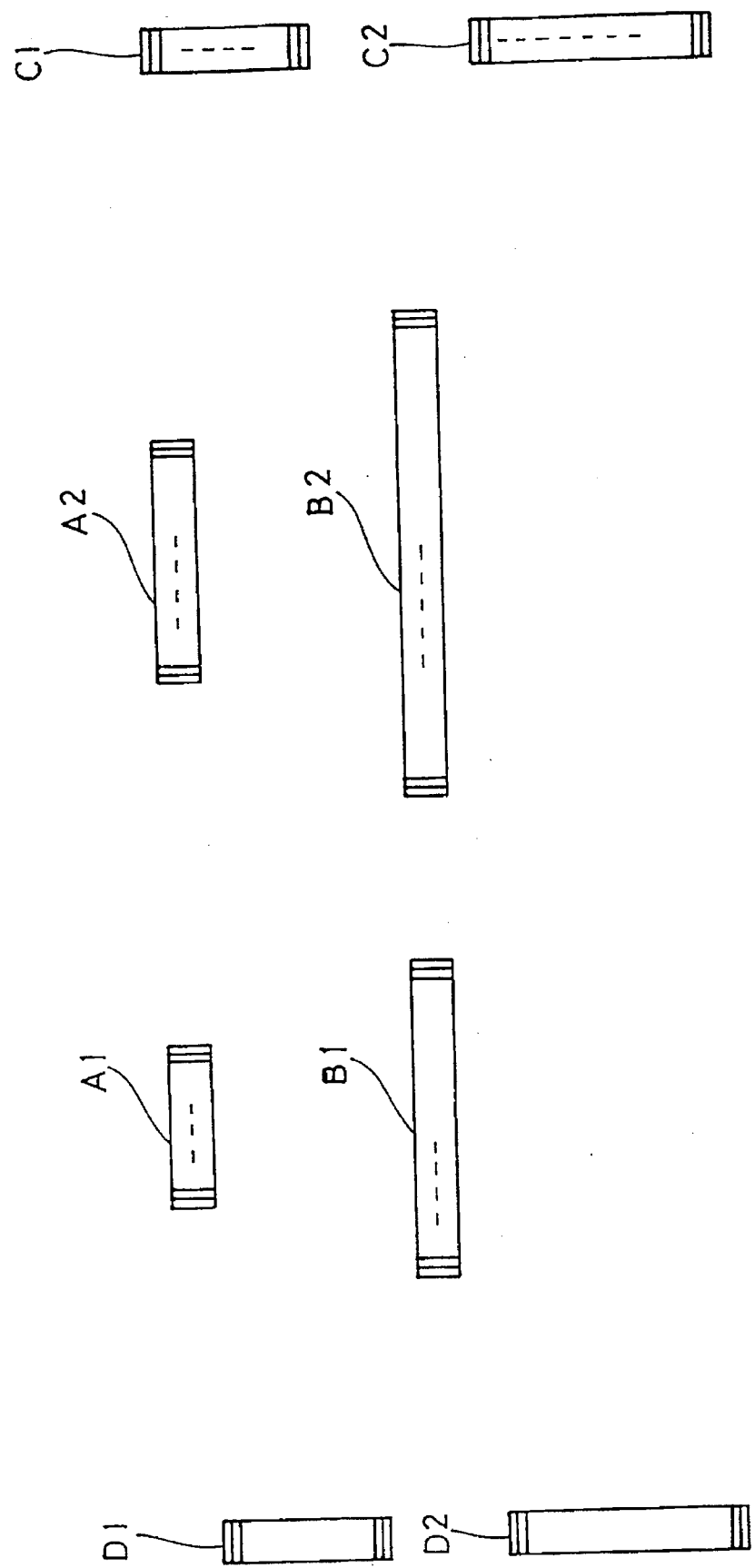
FIG. 4 is a diagram showing a specific arrangement of the CCD substrates of FIG. 2 corresponding to the focus detecting area of FIG. 3.

FIG. 4 is a diagram showing a specific arrangement of line sensors in the CCD substrate 1 shown in FIG. 2.

In the drawing, basic portions include A-1, B-1, C-1 and D-1 and reference portions include A-2, B-2, C-2 and D-2. The pairs of reference numerals A-1 and A-2, B-1 and B-2, C-1 and C-2, and D-1 and D-2 are corresponding basic portions and reference portions, respectively, which are for focus detection based on correlation between image of a basic portion and image of a reference portion shifted therefrom.

In the embodiment, by means of LCD, displays indicative of contents of the following described various functions are made besides that indicative of focus detecting area, therefore those are displayed in the finder with super-imposed inside of a frame delineating a field of view.

Figure 5:
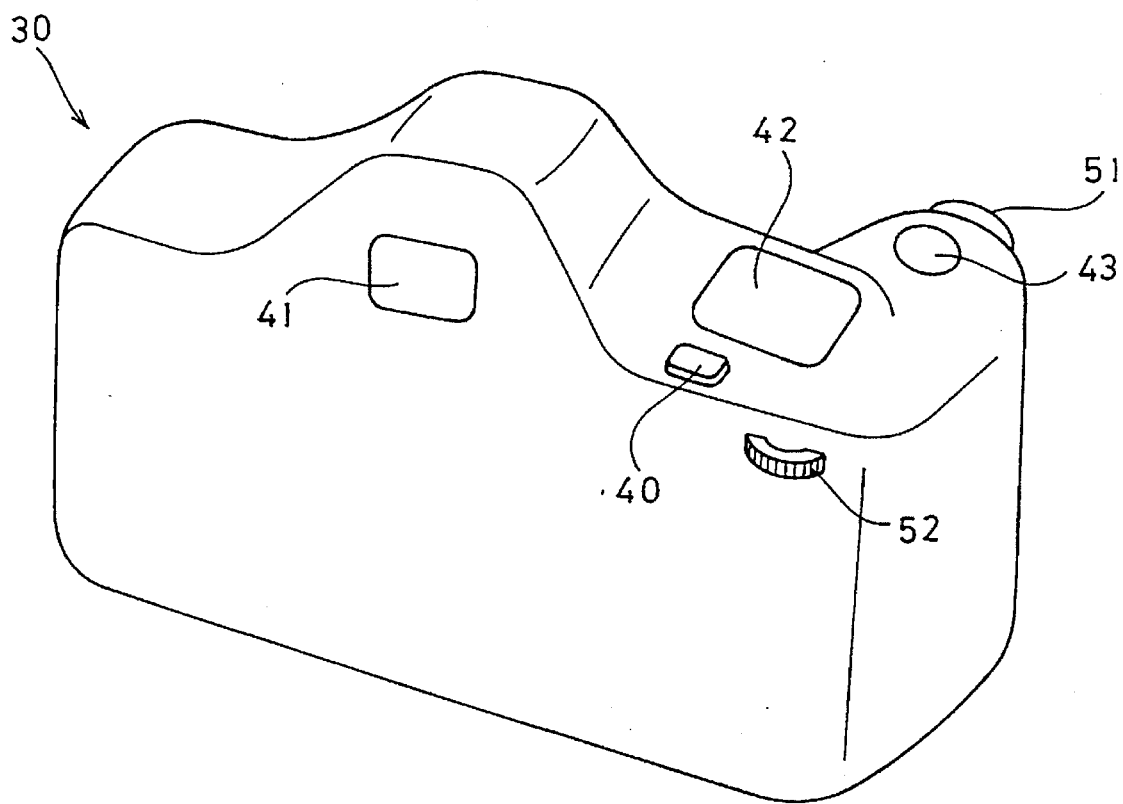
FIG. 5 is an outer view seen from the rear side of the camera 30.

FIG. 5 is an outer view seen from the rear side of a camera 30. The configuration of the camera body 30 is applicable to the first and the second embodiments. A finder 41 is provided at an appropriate position of the rear part of the camera 30. As described above, the contents of focus detecting areas and various functions are displayed in the finder 41. Some of the contents of the functions are also displayed in an on-body display portion 42 comprising LCD or the like provided at an appropriate position of the upper part of the camera 30. 43 denotes a shutter button, pressing of which starts photographing. A first stroke of the shutter button 43 turns on a photographing preparation switch 49 which will be described later and a second stroke thereof starts exposure.

The camera body 30 is further provided with a function button 40 which selects various functions such as exposure compensation "+/−", AF areas, film sensitivity compensation ISO and single/continuous photographing drive. In the present embodiment, the above-described four functions are divided into two groups. The first group includes the exposure compensation "+/−" and AF areas and the second group includes the film sensitivity compensation ISO and the single/continuous photographing drive. The two groups are alternately selected at every press of the function button 40.

Rightward and leftward rotatable front up-down dial 51 is provided at the front side of the camera 30, which dial is used for changing the function contents of the exposure compensation "+/−" and the film sensitivity compensation ISO. Rightward and leftward rotatable rear up-down dial 52 is provided at the rear side of the camera 30, which dial is used for changing the function contents of the AF areas and single/continuous photographing drive. A focus mode switch (not shown) is provided at the front side of the camera 30. The focus mode switch serves for switching between AF mode and FA (focus aid) mode.

Figure 6:
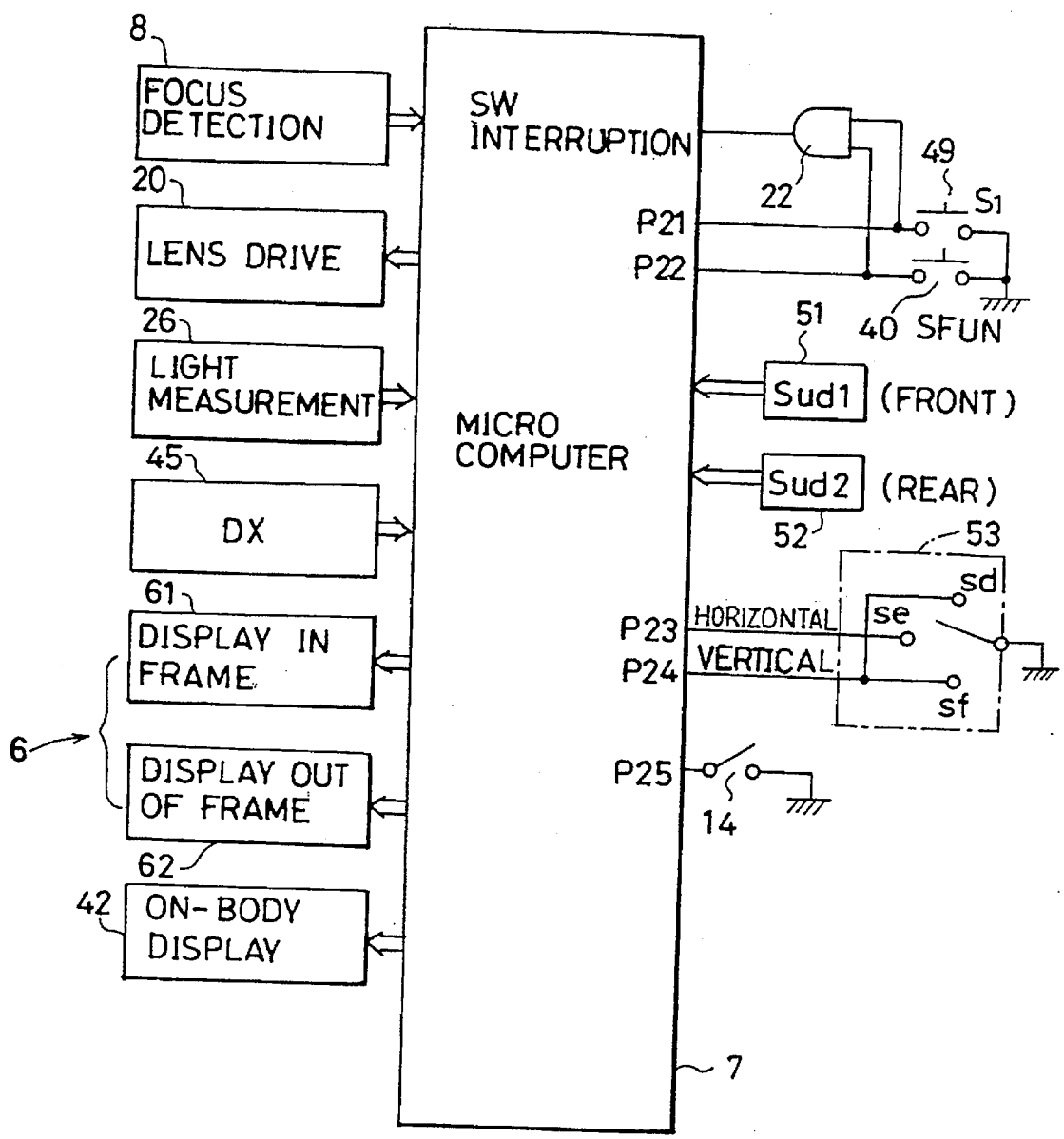
FIG. 6 is a block diagram showing a control system of the camera according to the present invention.
Figure 15:
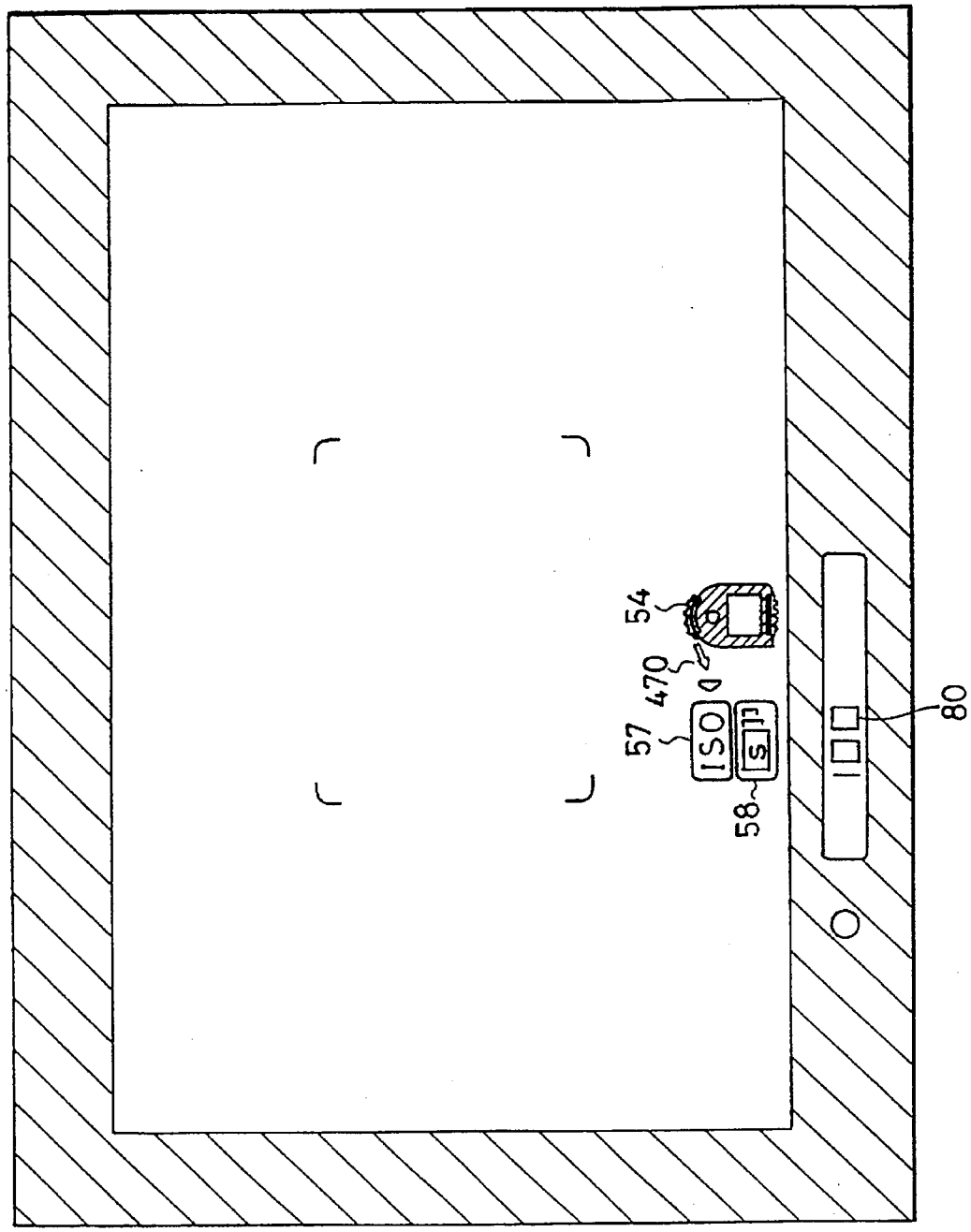

FIG. 6 is a block diagram showing the control system of the camera according to the third embodiment of the present invention and corresponds to FIGS. 5 and 15 of the first and the second embodiments, respectively. The same portions as those of the previous embodiments are given the same reference numerals, of which no description is made.

A DX sensor 45 reads a film sensitivity recorded on a loaded film (not shown). A LCD driving circuit 6 operates for displaying the area and a necessary function and the contents thereof in the finder area and includes an inside frame display driving circuit 61 for controlling a display displayed inside of in a frame wherein an object is to be displayed in the finder area, and an out-of-frame display driving circuit 62 for controlling a display at an appropriate position in the periphery outside of the frame wherein the object is to be displayed. 47 denotes an on-body display portion activating an on-body display portion 42 to make a display.

An AND gate 42 receives an interruption signal and the opposite input ends thereof are pulled up at a high level potential by terminals P21 and P22 of CPU 7. When the photographing preparation switch 49 or the function button 40 is turned on, CPU 7 receives a low level potential via AND gate thereby acknowledging interruption. The CPU 7 can make a determination whether the interruption comes from the terminal P21 or P22 based on the level changes thereof. The front up-down dial 51 and the rear up-down 52 output a signal corresponding to a rotating direction to the CPU 7.

Figure 7:
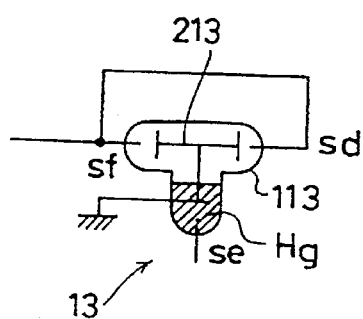
FIG. 7 is a diagram of an arrangement showing one example of a situation sensor.

A situation sensor 53 is attached to an appropriate position of the camera body 30 for sensing that the camera 30 is held its longitudinal side vertical to or in parallel with a horizontal direction, and one example of the arrangement thereof is shown in FIG. 7.

FIG. 7 shows a horizontally positioned camera 30 wherein a quasi T-shaped sealed container 113 is filled with conductive fluid such as adequate mercury Hz or the like. Terminals $S_d$–$S_f$ are provided at the respective end portions of the T-shape. A common wiring 213 is provided in the container, slightly spaced apart from the respective terminals $S_d$–$S_f$. As can be seen from the drawing, the terminal $S_e$ and the common wiring 213 conduct via mercury Hg. As a result, the terminal $S_e$ is grounded, thereby sensing that the camera 30 is held horizontally (lateral situation). A lead line connects the terminals $S_d$ and $S_f$, which enables detection of a vertical situation of the camera 30 irrespective of rightward and leftward rotations of the camera. That is, back to FIG. 6, the potentials at the terminals P23 and P24 of the CPU 7 are pulled up to a "H" level. When the camera 30 is horizontally held, the potential at the terminal P23 drops to a low level and when it is vertically held, the potential at the terminal P24 drops to a low level. The CPU 7 distinguishes a terminal which potential drops to a low level to detect the situation of the camera 30. A focus mode switch 14 is connected to the CPU 7 through a terminal P25.

Figure 8:
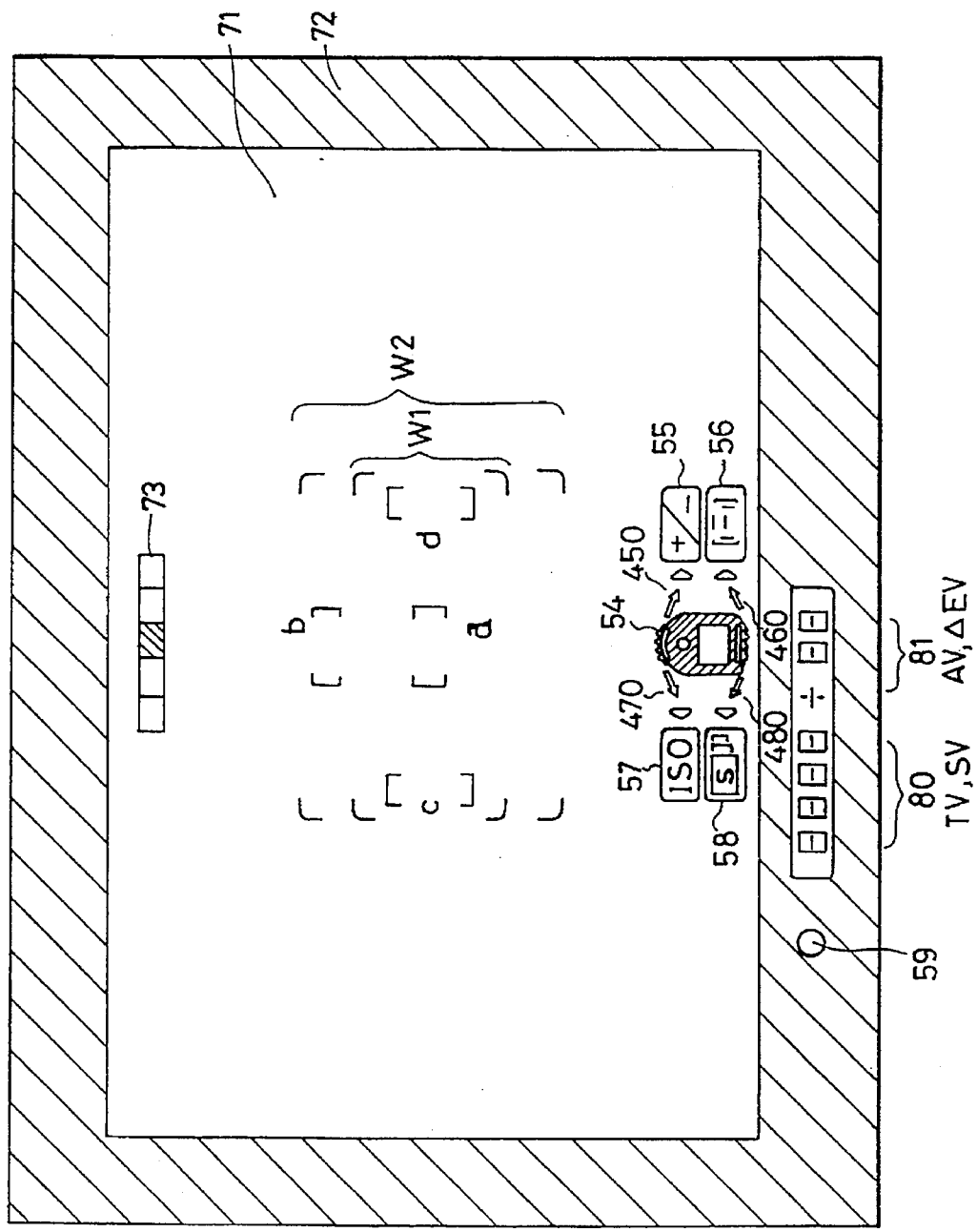
FIG. 8 is a diagram showing the display contents displayed on a LCD 24, that is, showing a state wherein all the display contents to be displayed in the finder area are displayed.

FIG. 8 is a diagram showing a state wherein the display contents of the LCD 2, that is, all the display contents in the finder area (lightened). In the drawing, the inner white portion is an inside frame display portion 71, display of which is driven by the inside frame display driving circuit 61. The surrounding portion with oblique lines is an out-of-frame display portion 72, display of which is driven by the out-of-frame display driving circuit 62.

In the inside frame display portion 71, an upper FA meter display portion 73 is used for focus aid. The FA meter display portion 73 includes five bar displays, the center position of which indicates an in-focus condition as shown in the drawing. The left-side bars indicate a rear focus condition and the right-side bars indicate a front focus condition. FIG. 8 shows an in-focus condition, for example.

Figure 13:
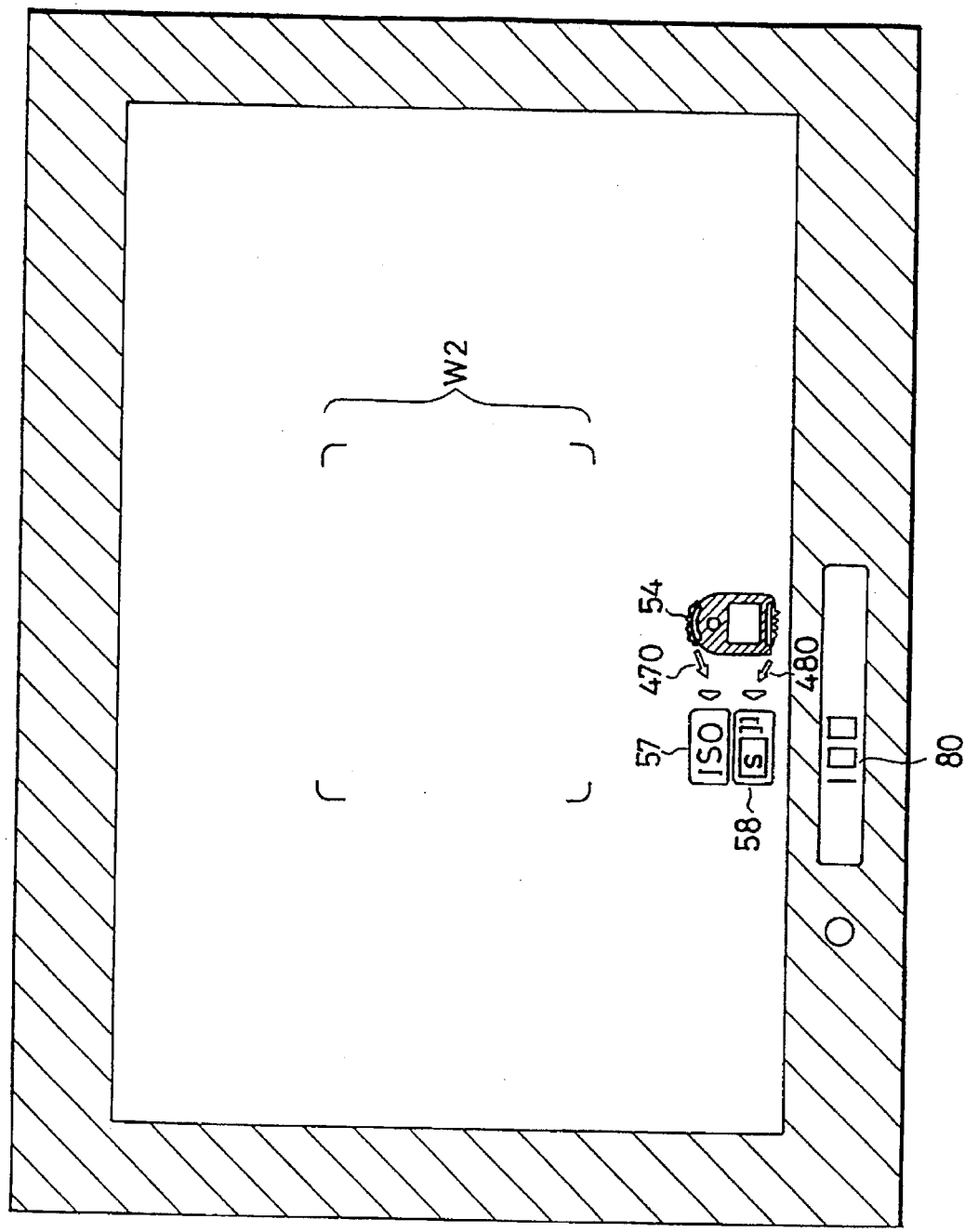

Respective areas a, b, c and d in the center portion are marked at the positions corresponding to the focus detecting area A–D of the second embodiment shown in FIG. 13 and the respective areas display designated focus detecting areas. A wide area $W_1$ includes the areas a, c, and d and is marked with display at the four corners and is symmetrical in both vertical and horizontal directions. A wide area $W_2$ includes all the areas a, b, c and d and is marked with display at the four corners, which is symmetrical only in the horizontal direction.

A dial mark 54 at the lower portion of the inside frame display portion 71 is a schematization of the front up-down dial 51 and the rear up-down dial 52. The upper portion of 54 corresponds to the front up-down dial 51 and the lower portion thereof corresponds to the rear-up down dial 52. Displayed at the right side of the dial mark 54 are a "+/–" mark 55 and an AF mark 56 indicative of the functions of exposure compensation "+/–" and an AF area, respectively, and displayed at the left side are an ISO mark 57 and a S/C mark 58 indicative of functions of film sensitivity compensation ISO and single/continuous photographing drive, respectively. Displayed correspondingly between the dial mark 54 and the respective marks 55–58 are selection marks 450, 460, 470, 480 indicative of a selection state.

The out-of-frame display portion 72 includes, from the left of the drawing, an in-focus indicator 59 lightening at an in-focus condition, a four-digit display portion 80 displaying a shutter speed TV and a film sensitivity value SV and a two-digit display portion 81 displaying an aperture value AV and an exposure compensation amount ΔEV. The two-digit display portion 80 displays + or – indicative of a compensation direction. The four-digit display portion 80 and the two-digit display 81 are not limited to display four digits and two digits, respectively, but a desired number of digits can be set.

Figure 9:
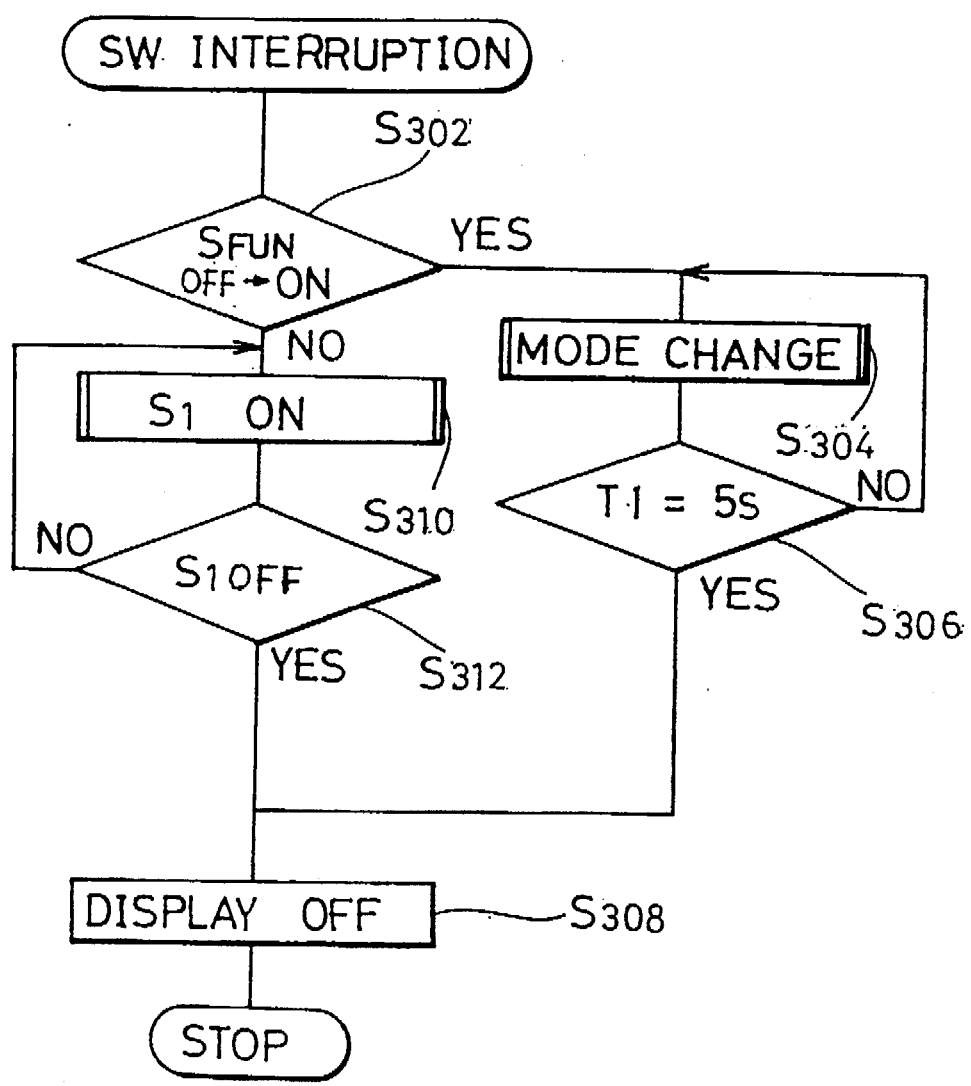

FIG. 9 is a flow chart explaining an interrupting operation when either the photographing preparation switch 49 or the function button 40 is turned on.

When either the photographing preparation switch 49 (represented as $S_1$ in the flow chart) or the function button 40 (represented as $S_{FUN}$ in the flow chart) is turned on, determination is first made whether the function button 40 is switched from off to on (Step S302). Determination can be made on which is turned on.

Figure 10A:
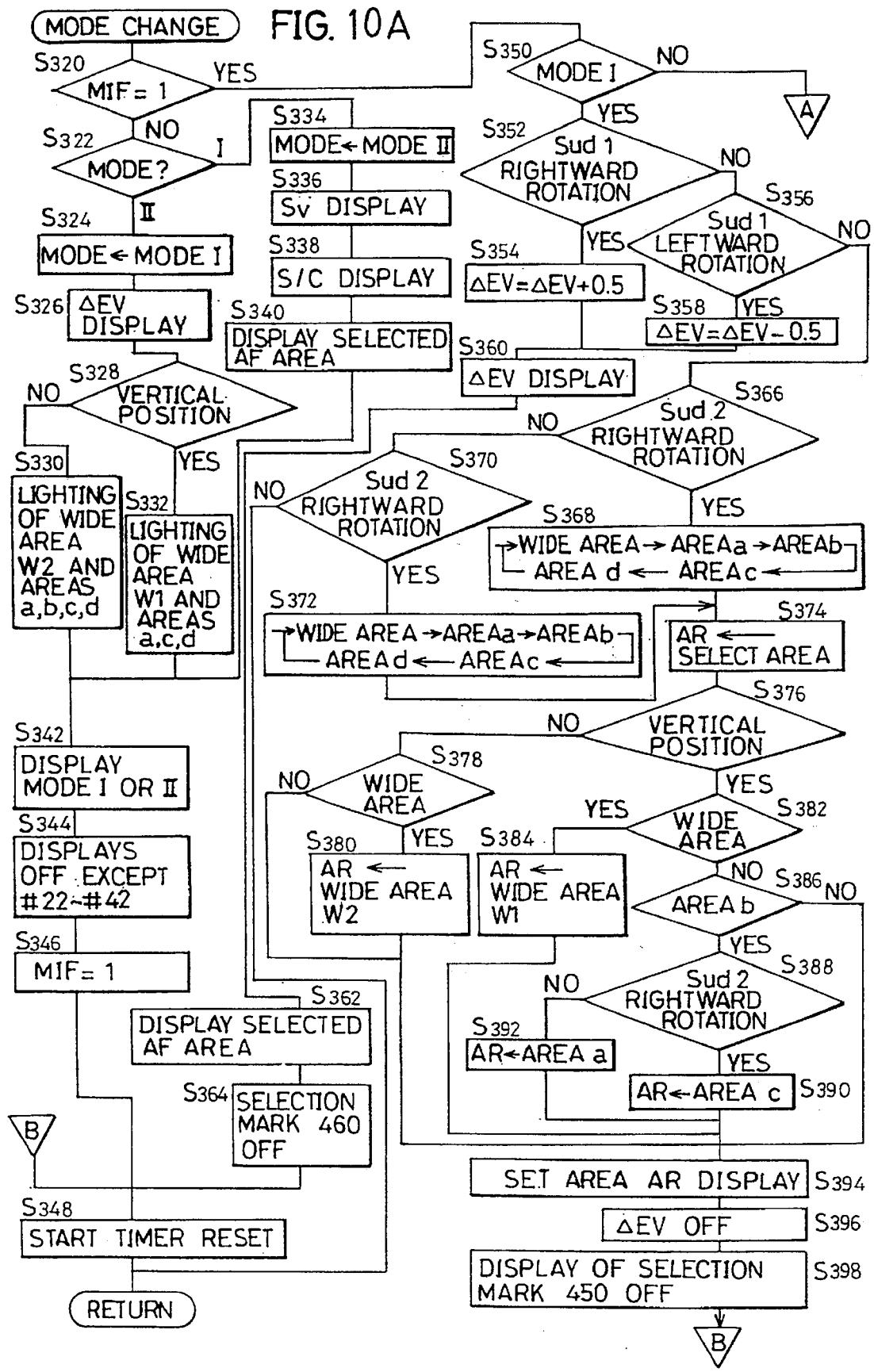
Figure 10B:
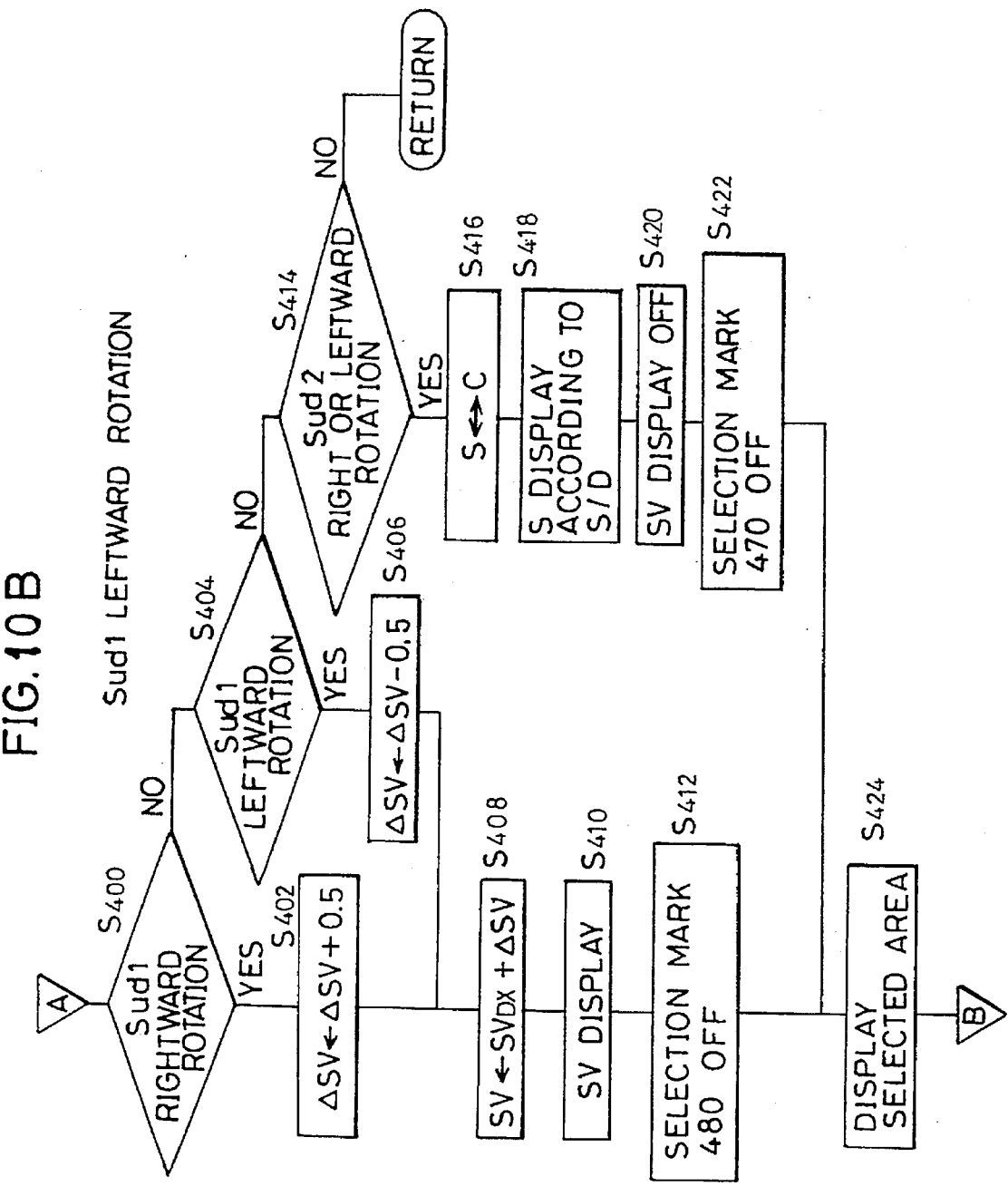

When the determination is made that the function button 40 is switched from off to on (YES in step S302), the processing for changing a mode shown in FIGS. 10A and 10B is executed (step S304). After a lapse of five seconds after the predetermined processing (YES in S306), the processing contents displayed in the finder area is turned off (step S308). When the determination is made that the photographing preparation switch 49 is switched from off to on (NO in step S302), the processing is executed shown in FIG. 18, which processing is to be performed at the turning-on of the photographing preparation switch 49 (step S310). At this time, if the photographing preparation switch 49 is turned off (YES in step S312), the display contents is turned off in step S308.

FIGS. 10A and 10B are flow charts explaining operational procedure for changing a mode when the function button 40 is switched from off to on. The operation procedure for a mode change will be described in the following with reference FIGS. 11–17.

In the drawings, a mode I denotes a selection of the above-described first group including the exposure compensation "+/–" and the AF area and a mode II denotes a selection of the above-described second group including the film sensitivity compensation ISO and the single/continuous photographing drive.

First, determination is made in step S320 whether the first mode flag MIF is "1", thereby determining whether the function button 40 is in the initial routine after the turning-on thereof.

If it is initial routine (NO in step S320), determination is made in step S322 whether the previously selected mode is I or II. More specifically, if the mode II is selected at a setting operation at the previous interruption when the function button 40 is turned on (mode II in step S322), the mode flag is changed to the mode I in step S324 for setting the mode I at an interruption at this time. Conversely, if the mode I is selected at the setting operation at the previous interruption (mode I in step S322), the mode flag is changed to the mode II in step S334 for setting the mode II at an interruption at this time.

As described above, a function mode is switched to another mode and set at every interruption by a turning-on of the function button 40. In other words, a function mode is cyclically changed.

Figure 11:
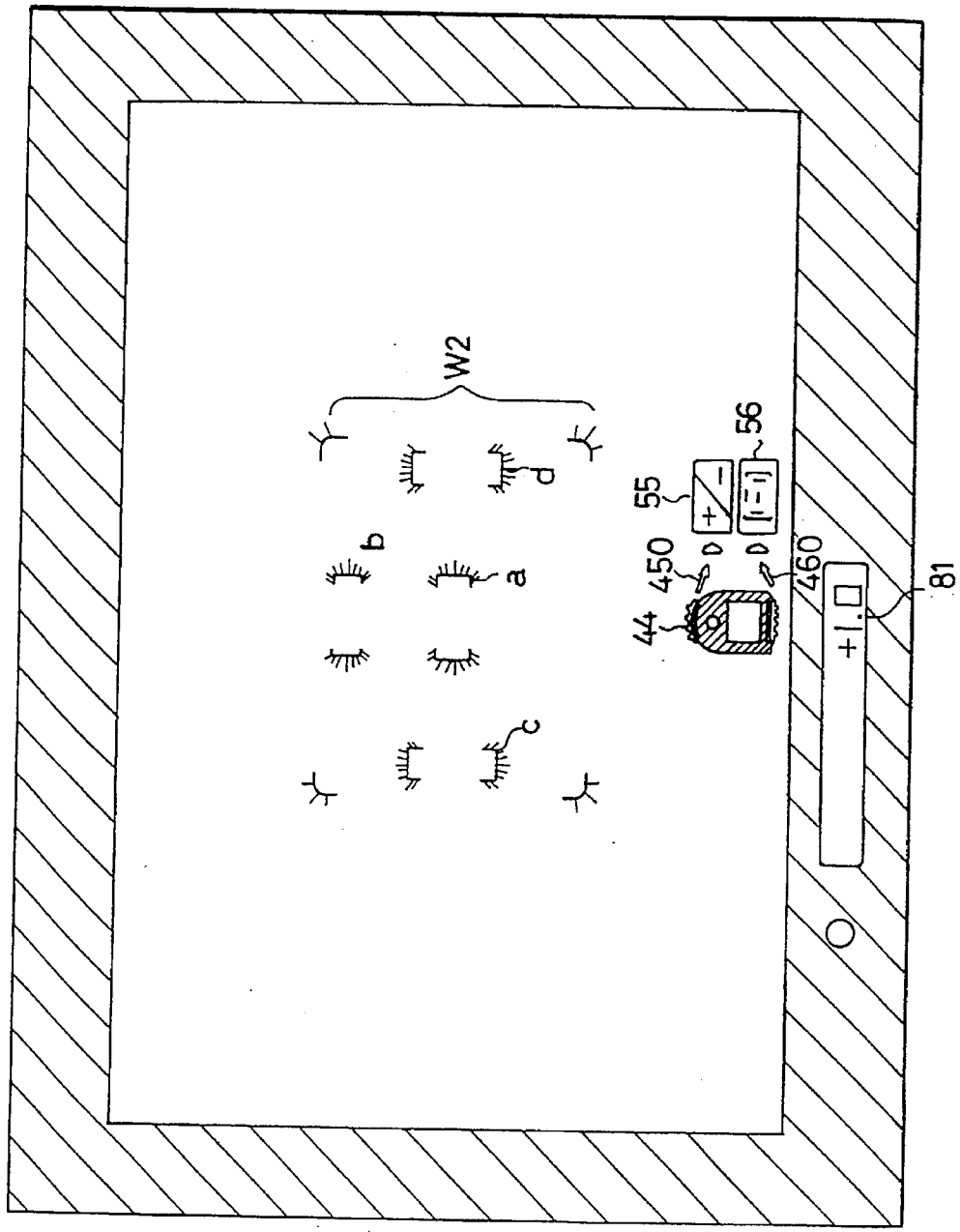
FIGS. 11–17 are diagrams showing states of displays in the finder image area at the respective Steps of FIG. 10.
Figure 12:
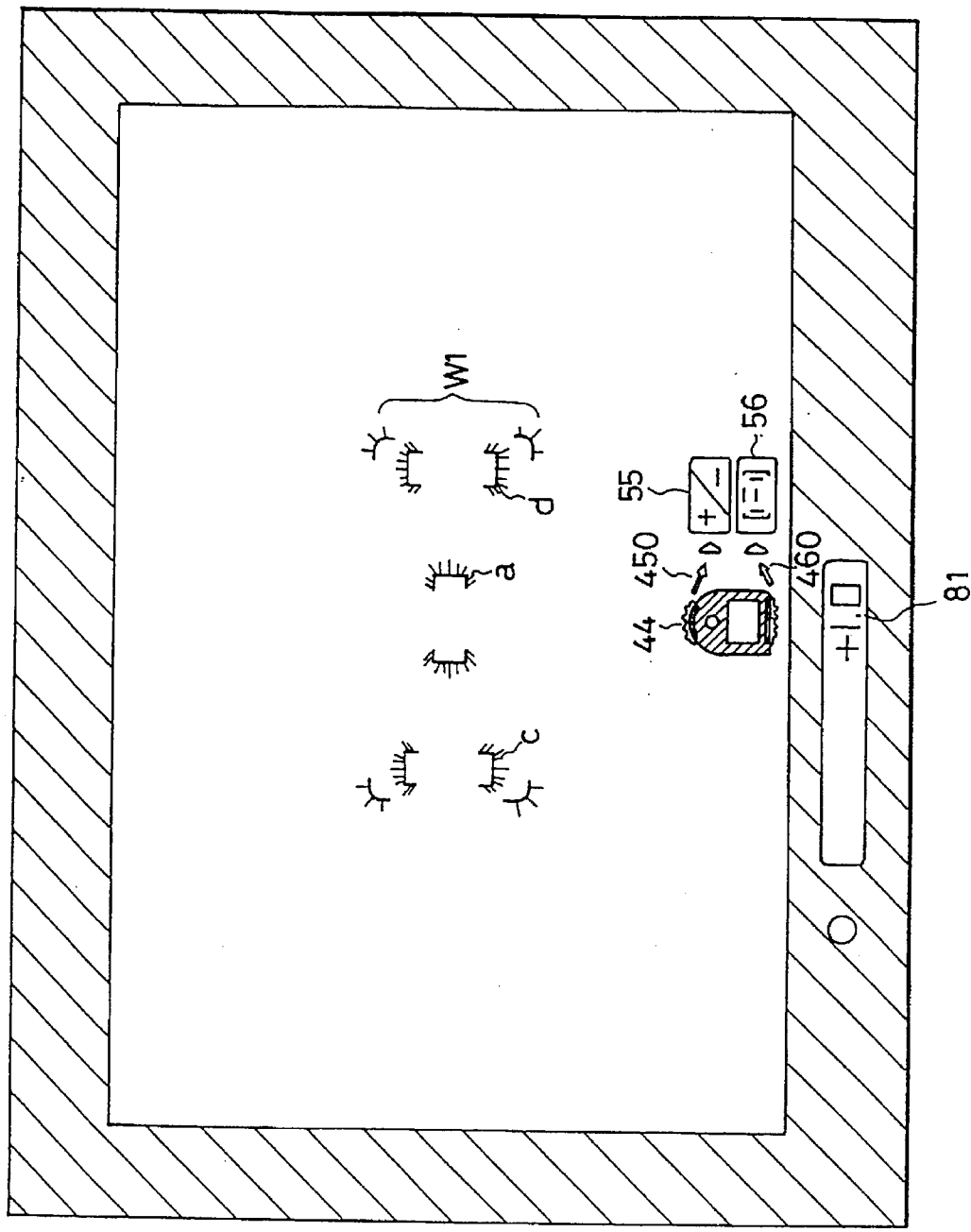

When the mode is changed to the mode I, the inside frame display portion 71 and the out-of-frame display portion 72 display the contents and the marks related to the exposure compensation "+/−" and the AF area which can be set in the mode I, as shown in FIGS. 11 and 12. Some of the display contents and the marks indicating the contents of the setting in the previous mode I are displayed also at this time, which makes confirmation of the previous setting contents and eliminates a necessity of setting the same contents as the former contents if the determination is made that no modification of the setting contents is required, as will be described later, resulting in a smooth operation of the camera.

In this example, the two-digit display portion 81 displays the previous exposure compensation amount ΔEV as an APEX value of 1.0, for example (step S326). Then, the situation sensor 53 senses the present situation of the camera 30. When the camera is held horizontally (NO in step S328), the respective marks of the focus detecting area a, b, c and d and the wide area $W_2$ which can be selected at a horizontal situation displayed with blinking to indicate that they can be selected as shown in FIG. 11 (step S330). On the other hand, when the camera 30 is held vertically (YES in step S328), the respective marks of the focus detecting area a, c and d and the wide area $W_1$ which can be selected at a vertical situation displayed with blinking to indicate that they can be selected as shown in FIG. 12 (step S332). Subsequently, the dial mark 54, the "+/−" mark 55 and the AF mark 55 indicative of functions in the mode I and the selection marks 450 and 460 thereof are displayed and the other displays are off (steps S342 and S344). Thereafter, the first mode flag MIF is set to "1" and furthermore, said built-in timer is reset to start counting five seconds (steps S346 and S348). The program returns to step S306 of FIG. 9.

When the mode is changed to the mode II in step S334, successively the inside frame display portion 71 and the out-of-frame display portion 72 display the contents and the masks related to a film sensitivity ISO and single/continuous photographing drive which functions can be set in the mode II as shown in FIG. 13. More specifically, first, the four-digit display portion 80 displays 100, for example, as the previous film sensitivity SV (step S336) and then, displays the contents of the previous single/continuous photographing drive (step S338). In the case of FIG. 13, the character "S" indicative of single photographing drive is displayed in the S/C mark 58. The area selected at present (in the previous mode I) is displayed (step S340). It can be seen from FIG. 13 that the wide area W2 is selected. Displayed in step S342 are the dial mark 54, the ISO mark 57, the S/C mark 58 and the selection marks 470 and 480 thereof of the mode II.

Like the previous case, the program returns to step S306 of FIG. 9 after the turning-off of the other displays (the setting of the first mode flag MIF to "1" and the start of a reset of the built-in timer (steps S344–S348).

In step S306, if the setting operation of the function contents is started before an elapse of five seconds, the flow for changing a mode (step S304) continues.

As described above, when the inside frame display portion 61 and the out-of-frame display portion 62 of the finder display the previous setting contents, the program returns to step S320 wherein determination is made of a state of the first mode flag MIF. In this case, that is, in the routine after the initial one, with the first mode flag MIF being set to "1" (YES in step S320), the program proceeds to step S350 wherein determination is made whether the mode I is selected.

Figure 14:
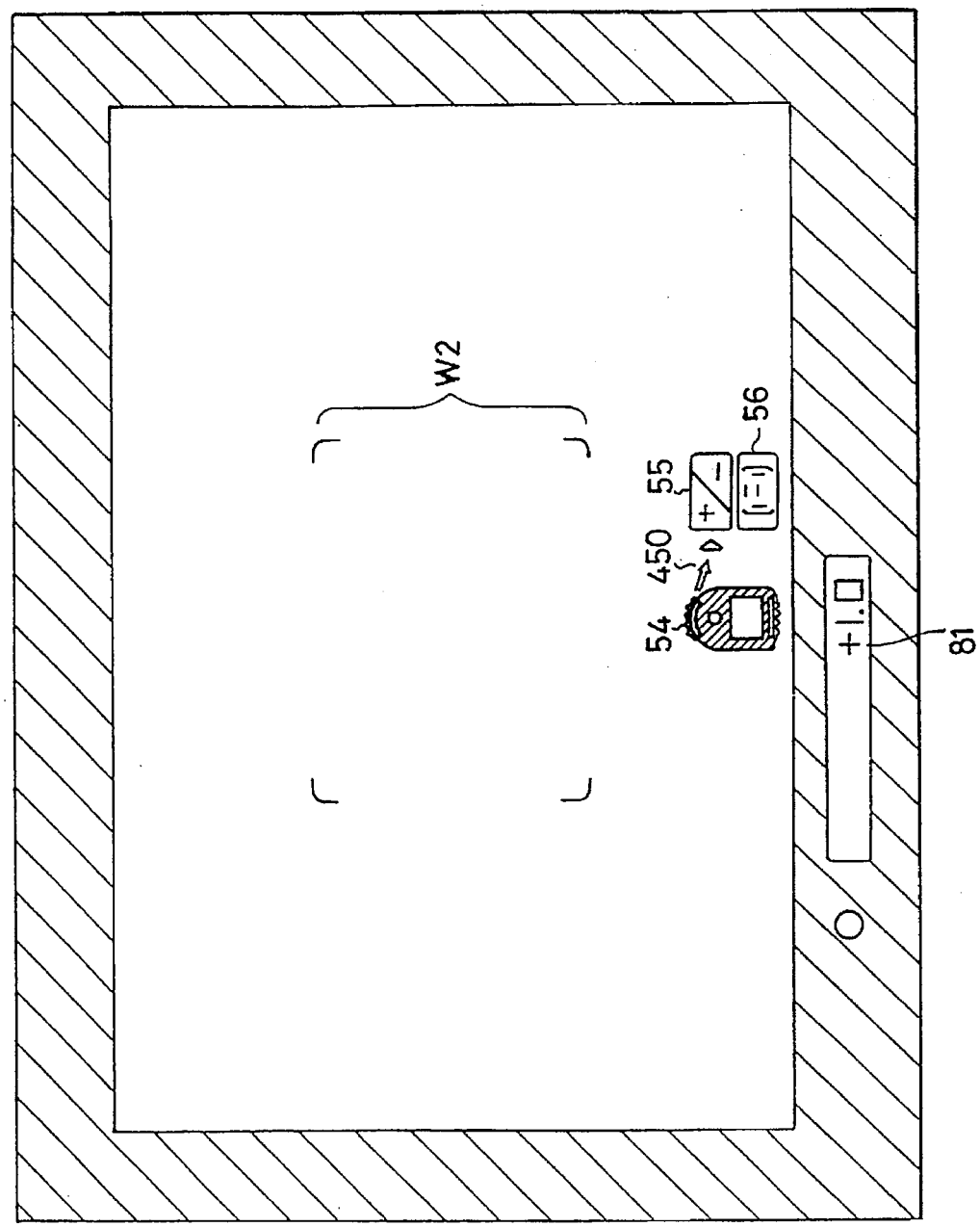

When the mode I is selected, determination is first made of a rotation of the front up-down dial 51 (represented as $Sud_1$ in the flow chart) (in steps S352 and S356, see FIG. 14). More specifically, when the front up-down dial 51 rotates rightward (YES in step S352), an APEX value 0.5 is added to the exposure compensation amount ΔEV. The addition result is displayed in an APEX value of 1.0, for example, in the two-digit display portion 81 (steps S354 and S360). At this time, the already selected area (as will be described later, the area set when the rear up-down dial 52 is first operated after the first mode flag is set to "1" or the area set in the mode I at the previous interruption) is displayed (in the case of FIG. 14, the wide area W2 is selected). At the same time, the display of the selection mark 460 is turned off in order to indicate that the AF areas is not in setting at present. On the other hand, when the front up-down dial 51 is rotated leftward (NO in step S352 and YES in step S356), 0.5 as an APEX value is subtracted from the exposure compensation amount ΔEV and the subtraction result is displayed in an APEX value of 1.0, for example (steps S358 and S360).

Then, when the front up-down dial 51 is rotated neither in right nor left direction, determination is made of a rotation of the rear up-down dial 52 (represented as Sud2 in the flow chart) (NO in both steps S352 and S356 and steps S366 and S370). Selection of an area of the inside frame display portion 71 corresponding to a focus detecting area is forwardly or backwardly made cyclically every time the rear up-down dial 52 is rotated rightward (YES in step S366) or leftward (NO in step S366, YES in step S370) (steps S368 and S372, see FIG. 15).

Although, for convenience sake, FIG. 33 shows all the area marks which can be selected, only one area among them is selected in practice and displayed, as will be described later.

At a first operation of the rear up-down dial 52, areas which can be selected are displayed with blinking as shown in steps S330 and S332. An area is selected among them. The rear up-down dial 52 rotates rightward or leftward to select an area which is to be set as a setting area AR. Subsequently, the situation of the camera 30 is sensed (step S376). When the camera 30 is held horizontally and the setting area AR is a wide area (YES in step S376 and YES in step S378) the wide area W2 is set as a setting area AR (step S380). If the other areas are selected (NO in step S378), the area selected in step S374 is set as a area AR.

When the camera 30 is held vertically and the setting area AR is a wide area (NO in step S376 and YES in step S382), the wide area W1 is set as a setting area AR (step S384). When the setting area AR is the area b (YES in step S386), a rightward rotation of the rear up-down dial 52 enables a setting of the area c in place of the area b as the setting area AR and a leftward rotation of the dial enables a setting of the area a in place of the area b as the setting area AR (NO in step S388, step S392) because the area b can not be selected when the camera is held vertically. When the area a, c or d is selected (NO in step S386), the selected set as the setting area AR. After setting the area, the set area indicative of the setting area AR is display with lighting which is followed by turning-off of the exposure compensation amount ΔEV and an turning-off of the selection mark 450 indicating that the function of exposure compensation "+/−" is not in setting at present (steps S394–S398). Subsequently, the program returns to step S320 through steps S348 and S306 (FIG. 9) and further proceeds to step S352.

In order to further change an exposure compensation amount ΔEV, the front up-down dial 51 is successively rotated rightward or leftward until a desired exposure compensation amount is obtained. In order to further change an area, the rear up-down dial 52 is successively rotated rightward or leftward until a desired area can be set in step S366 or step S370.

A lapse of five minutes wherein neither the front up-down dial 51 nor the rear up-down dial 52 is operated, is taken by the CPU 7 for a termination of a setting, thereby turning off all the displays (FIG. 3, step S308). Alternatively, an area which can be selected may be displayed with lighting and a selected area may be displayed with blinking.

Figure 16:
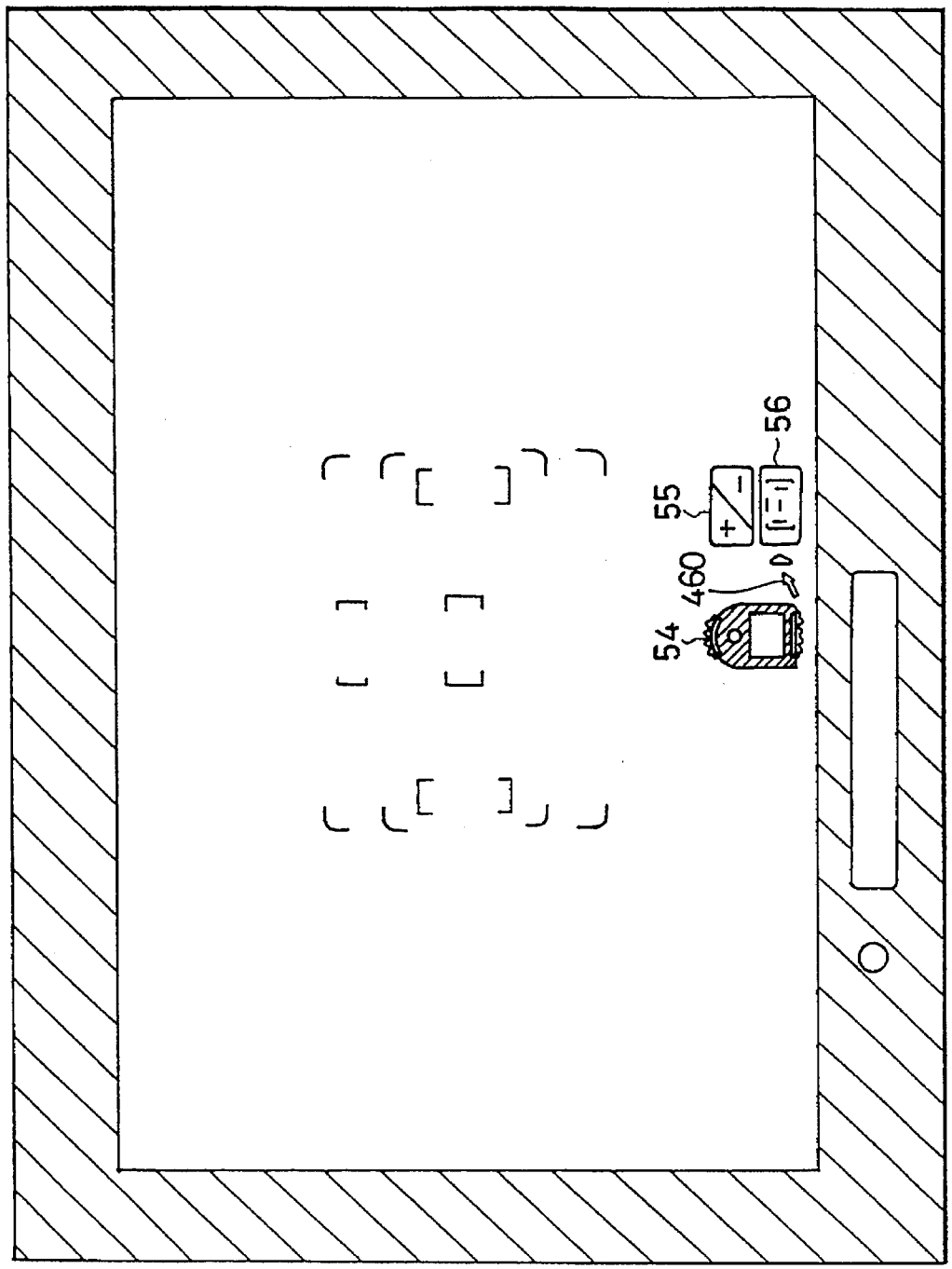

When the mode II is selected (NO in step S350), determination is made first of a rotation of the front up-down dial 11 (steps S400 and S404, see FIG. 16). More specifically, when the front up-down dial 51 is rotated rightward (YES in step S400), as an APEX value 0.5 is added to the film sensitivity compensation value ΔSV. Furthermore, the four-digit display portion 80 display the value SV obtained by adding, to the addition result (ΔSV), a sensitivity value $SV_{DX}$ (APEX value) read from a film cartridge as 100 (the APEX value 5) as shown in FIG. 16 (steps S402, S408 and S410). An APEX value is not adopted as a display value for a photographer's sake. Both can be used as display. Then, the display of the selection mark 480 is turned off in order to indicate that the function of single/continuous photographing drive is not in setting at preset and the selected area is displayed (steps S412 and S424). On the other hand, when the rear up-down dial 51 is rotated leftward (NO in step S400 and YES in step S404), the APEX value 0.5 is subtracted from the film sensitivity compensation value ΔSV. Furthermore, the two-digit display portion 81 displays the value SV obtained by adding the sensitivity value $SV_{DX}$ (APEX value) read from the film cartridge to the subtraction result as 100, for example, in the same manner as in the previous case (steps S406, S408 and S410). Subsequently, the display of the selection mark 480 is turned off in order to indicate that the function of single/continuous photographing drive is not in setting at preset and the selected area is displayed (steps S412 and S424).

Figure 17:
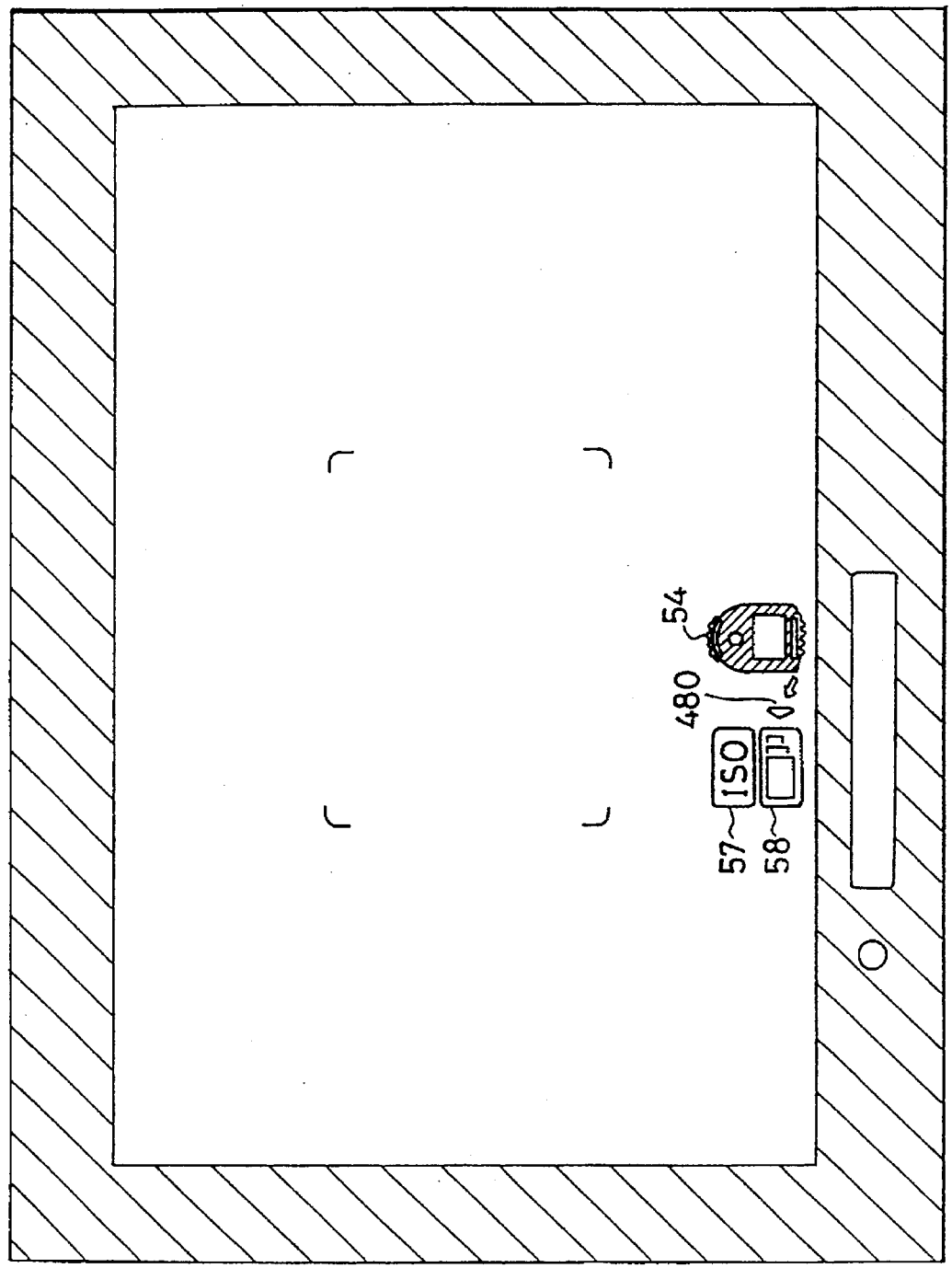

If the front up-down dial 51 is rotated neither rightward nor leftward, determination is made of a rotation of the rear up-down dial 52 (NO both in steps S400 and S404, step S414). Single photographing drive S and continuous photographing drive C are alternately set (step S416) every time the rear up-down dial 52 is rotated rightward or leftward (YES in step S414). With the single photographing drive being set, the character "S" is displayed in the S/C mark 58 as shown in FIG. 16, and with the continuous photographing drive being set, only the character "S" in the S/C mark 58 is erased as shown in FIG. 17 (step S418). Thereafter, the display of film sensitivity value and the selection mark 470 are turned off in order to indicate that the function of the film sensitivity compensation ISO is not in setting at present and the selected area is displayed (steps S420–S424).

Figure 18:
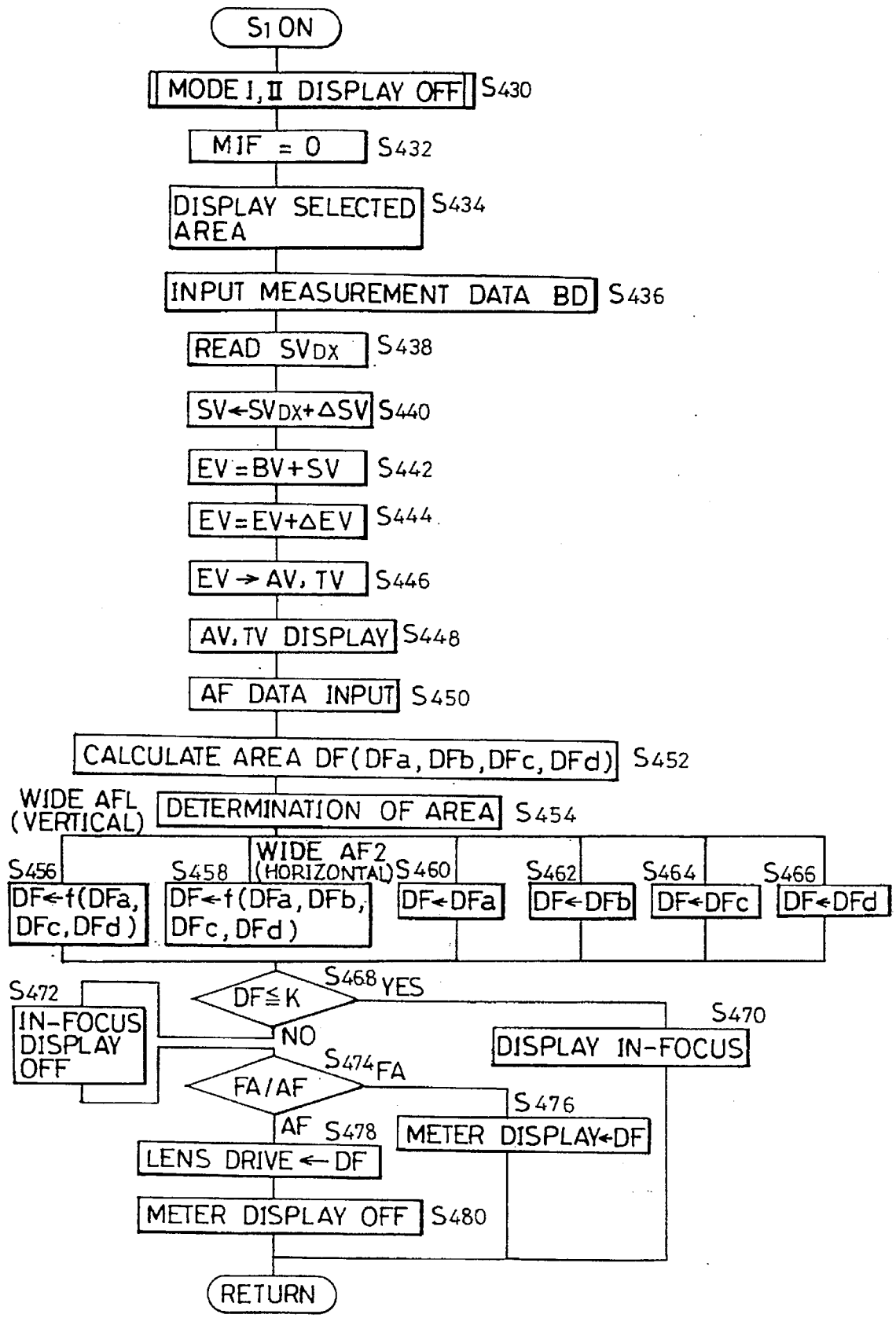
FIG. 18 is a flow chart explaining an operation when the photographing preparation switch is thrown.

FIG. 18 is a flow chart explaining an operation of the photographing preparation switch 49 at its stroke. The operation will be described in the following with reference to FIG. 19.

Upon a start of an interruption by throwing the photographing preparation switch 49, the display of the modes I and II, that is, the dial mark 54, the "+/−" mark 55, the AF mark 56, the ISO mark 57 and the S/C mark 58 and the other selection marks 450–480 are first turned off. The previously set area is displayed (steps S430 and S434).

At this time, the first mode flag MIF is reset to "0" (step S432). With the first mode flag MIF being reset, the processing of displaying the previous set contents is executed prior to the procedure of a setting operation at the interruption in response to the next turning-on of the function button 40 (NO in step S320 and steps S322–S346).

Figure 19:
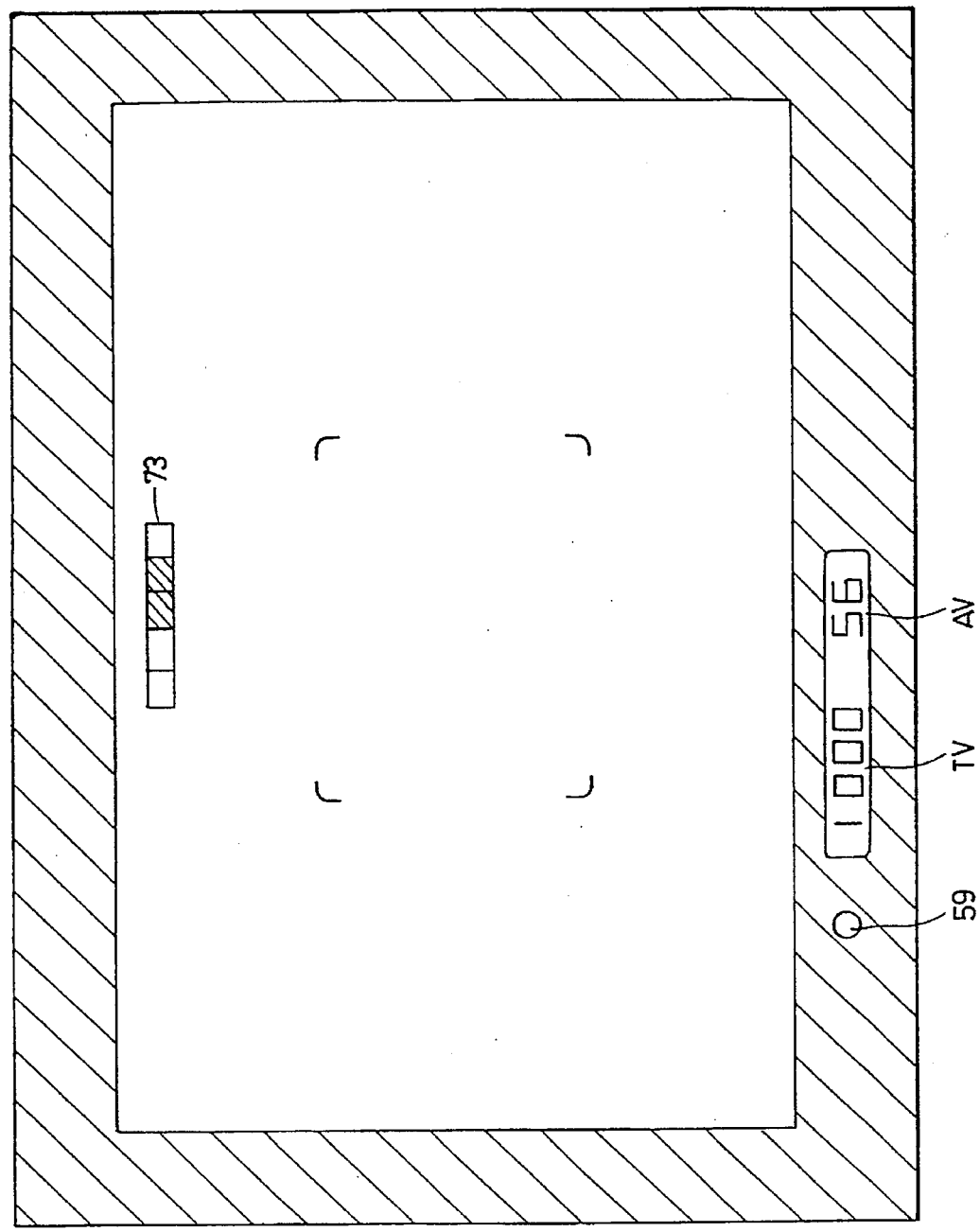
FIG. 19 is a diagram showing a display state of the finder image area at each step of FIG. 18.

Subsequently, the brightness BD of the object obtained in the light measuring circuit 26 is accepted and the film sensitivity value $SV_{DX}$ is read from a film cartridge (not shown), so that the film sensitivity compensation value ΔSV is added to the film sensitivity value $SV_{DX}$ (steps S436–S440). An exposure amount EV is obtained by adding the brightness BD of the object to the compensated film sensitivity value SV. Furthermore, an exposure compensation amount ΔEV is added to the obtained exposure amount EV. An aperture value Av and a shutter speed Tv are obtained based on the compensated exposure value EV in accordance with a relation between an aperture value Av and a shutter speed Tv with respect to a previously set exposure value (steps S442–S446). The aperture value Av and the shutter speed Tv are displayed in the out-of-frame display portion 62 as shown in FIG. 19 (step S448). The aperture value Av and the shutter speed Tv are also displayed in the on-body LCD 42.

Then, the AF data of the respective focus detecting area a–d obtained by the focus detection circuit 8 is accepted, based on which data defocus amounts DFa–DFd are calculated (steps S450 and S452). Then, determination is made of the area selected by the function of the AF area (steps S454). That is, when the wide area W1 is selected, a defocus amount is set as a defocus amount DF, by calculating an average value of the defocus amount DFa, DFc and DFd, or calculating an optimum defocus amount with the respective contrast states, or based on a defocus amount obtained by considering both the of the above described values. When the wide area W2 is selected, a defocus amount obtained on the basis of DFa–DFd in a similar manner to the above-described case is set as a defocus amount DF (steps S456 and S458). When the area a, b, c and d are selected, respectively, the defocus amount DFa, the defocus amount DFb, the defocus amount DFc, and the defocus amount DFd are set as a defocus amount DF (steps S460, S462, S464 and S466).

When a defocus amount DF is set as described in the foregoing, the defocus amount DF and an allowable level value k are compared with each other (steps S468). More specifically, if the set defocus amount DF is equal to or less than the allowable value k, the determination is made that the camera is at an in-focus condition, which is displayed (step S470). This display of the in-focus is made by lighting of the in-focus display portion 59 as shown in FIG. 19, which can be easily acknowledged by a photographer. If the set defocus amount DF is more than the allowable value k, the determination is made that the camera is not at an in-focus condition, so that no display is made of in-focus condition, or the display is off when out of in-focus condition (step S472). Then, determination is made in this case whether the camera is in a FA mode or an AF mode (step S474). If in FA mode, the set defocus amount DF is displayed by using bars in the FA meter display portion 73 as shown in FIG. 19 (step S474). The photographer manually drives the lens while looking at the bar display to set the camera in an in-focus condition. If the camera is set in the AF mode, the lens is automatically driven by the set defocus amount to set the camera in the in-focus condition. The FA meter display for use in the FA mode is not necessary and therefore is turned off (steps S478 and S480). Such operation is repeated while the photographing preparation switch 49 is pressed (NO in step S312 in FIG. 9). Then, when the photographing preparation switch 49 is released (YES in step S312), the respective display contents is turned off (step S308).

FIGS. 20–24 show other examples of displays in the finder display area. As shown in the drawings, selection marks include indication marks 90 and 91 and selection marks 451–481 corresponding to the respective functions.

Figure 20:
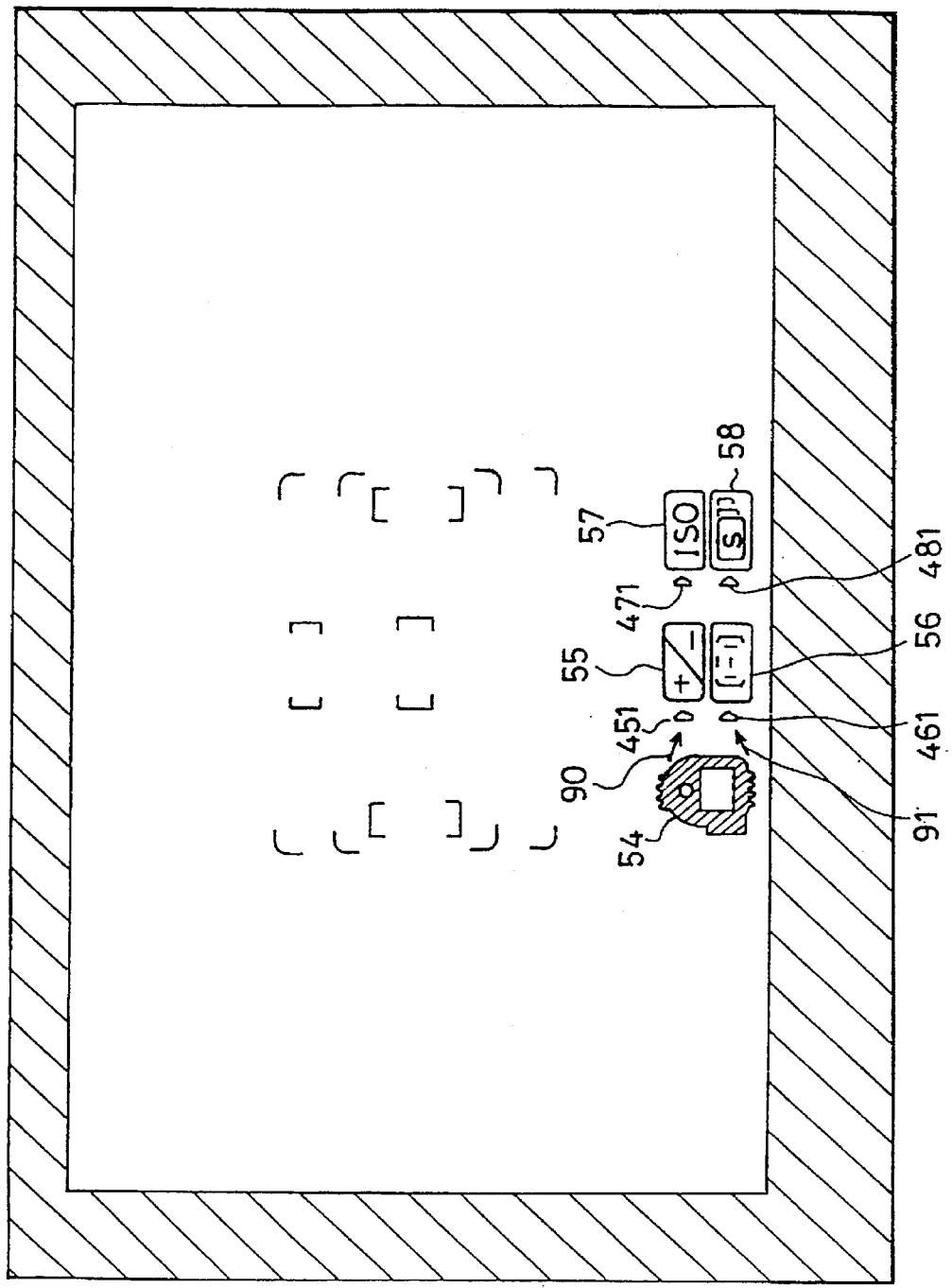

FIG. 20 shows marks 57 and 58 indicative of the functions of the mode II at the same side of marks 55 and 56 indicative of the functions of the mode I.

Figure 21:
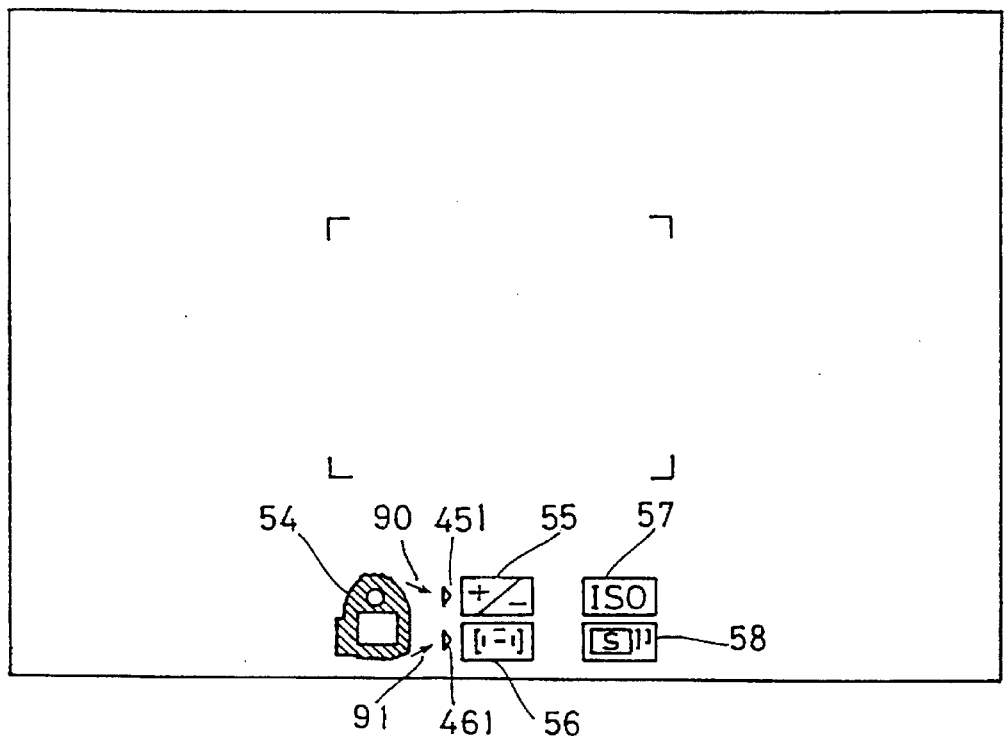
Figure 22:
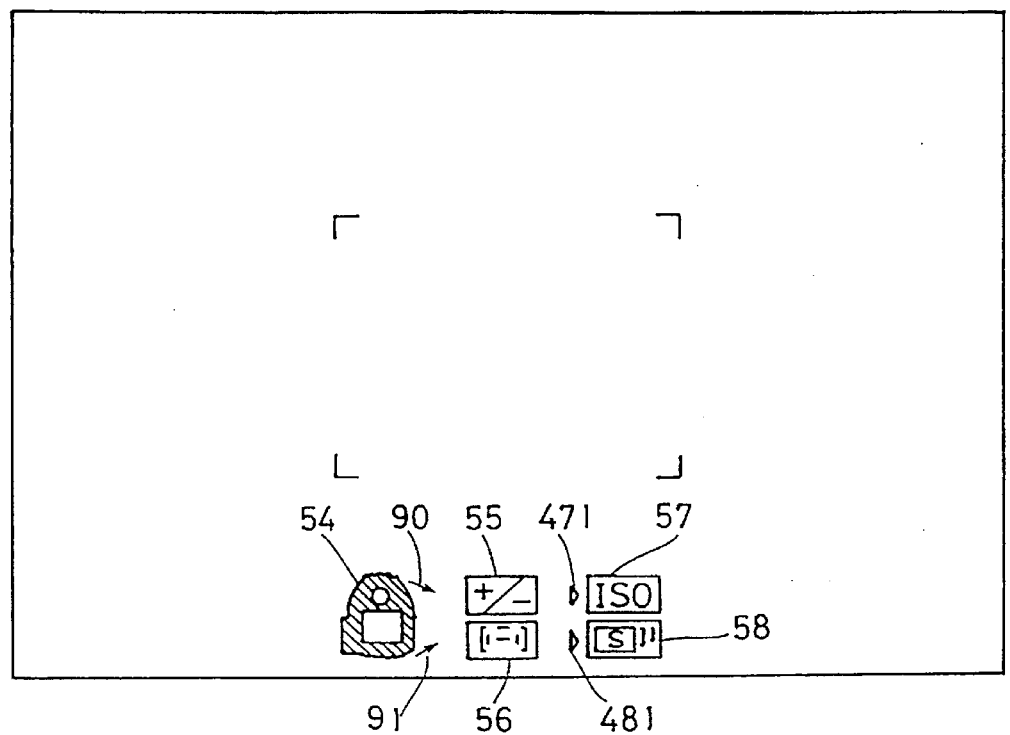
FIGS. 22–24 are diagrams showing the other examples of the displays in the finder image area.

FIGS. 21 and 22 show a first method of indicating a mode selection in FIG. 20 and FIGS. 13 and 14 show a second method of indication.

The first indication method is performed by displaying the selection marks 451–481 or turning off the same. More specifically, when the mode I is selected, the displays of the selection marks 471 and 481 are turned off as shown in FIG. 21. When the mode II is selected, the displays of the selection marks 451 and 461 are turned off as shown in FIG. 22.

Figure 23:
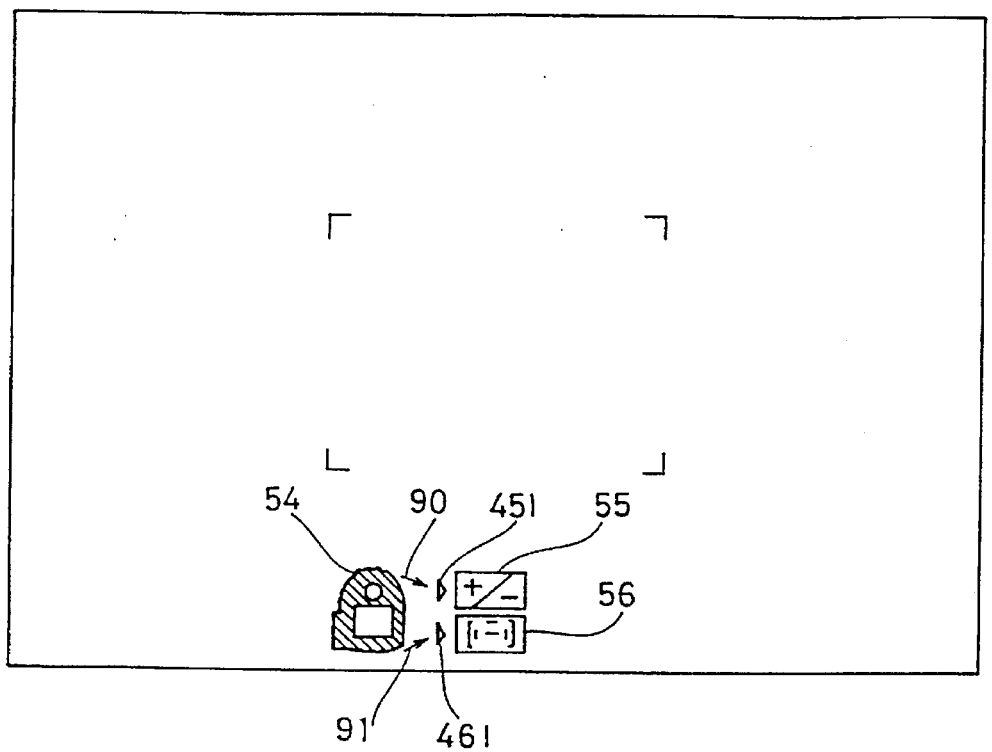
Figure 24:
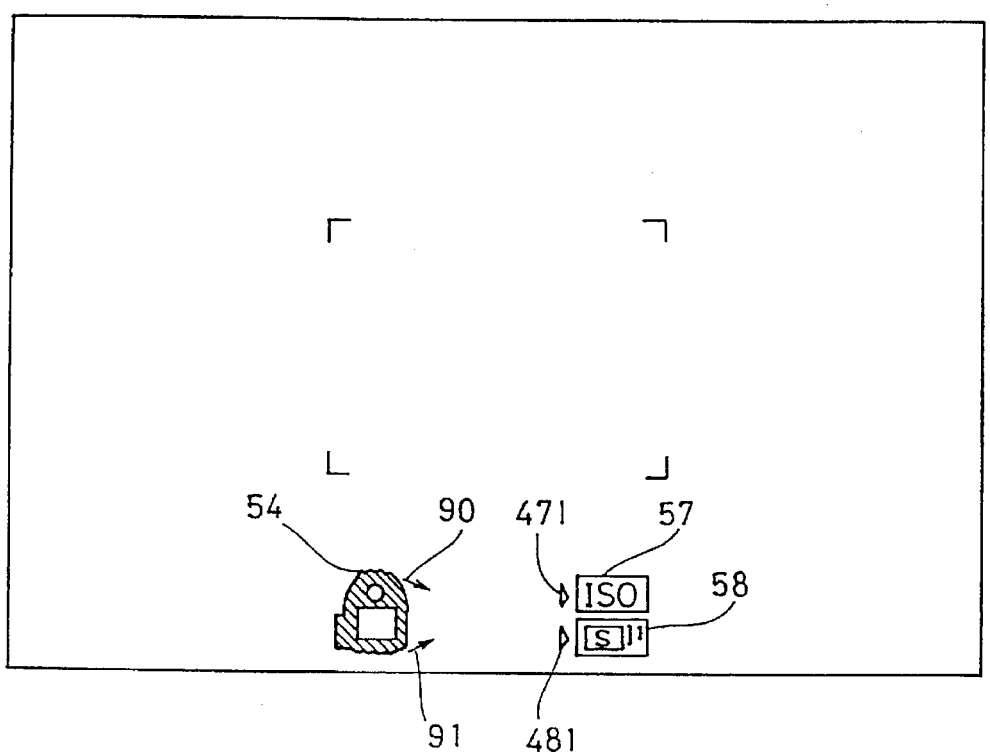

The second indication method is carried out by displaying or turning off the marks 55–58 of the respective functions and the selection marks 451–481 corresponding thereto in pair. More specifically, in the mode I, the displays of the ISO mark 57, the S/C mark 58 and the selection marks 471 and 481 corresponding thereto is turned off as shown in FIG. 23. In the mode II, the displays the "+/–" mark 55, the AF mark 56 and the corresponding selection marks 452 and 462 is turned off as shown in FIG. 24.

While display with lighting or display with blinking of the areas enables discrimination between the areas which can be selected and the selected area by using the function of the AF area in the present embodiment, the discrimination can be made by changing brightness of lighting or blinking period or the like. Color display can be also used for discrimination.

Four functions are provided which are divided into two groups in the present embodiment. The present embodiment is applicable to a camera having a lot of functions. For example, six functions are divided into three groups which can be cyclically changed. The functions can be divided into two groups, and an operation member for cyclic selection or selection on a group basis, and three setting operation members for setting the contents of the functions can be provided. A two-step selection operating member can be provided by roughly dividing the functions which are further divided into small groups. In this case, eight functions, for example, are divided into large groups each including four functions. Then, they are divided into small groups including two functions. Then, two selection operating member are enough by adopting a cyclic system. The number of operations is two at maximum, which is less than that in a case where two functions are simply selected cyclically (four times at maximum).

A more practical camera can be provided by grouping related functions. For example, in a continuous photographing drive mode wherein a moving object is often taken picture of, a wide area is appropriate as a focus detecting area which allows the object to be easily caught. In a single photographing drive mode, a focus detecting area is sometimes selected so as to focus on a desired part of a still object at a photographing thereof. Therefore, a change of a drive mode often requires a change of a focus detecting area at the same time. Setting these functions in the same group reduces a time required for a setting operation.

An apparatus to which a selection operating member and a setting operation member are applied is not limited to a camera, but in general, any apparatus operable under setting of a plurality of functions.

As described above, the third embodiment has the following effects. The photographer changing a focus detecting area might be puzzled and make a mistake in selecting the focus detecting areas if only the area having been selected is displayed in the finder and not the areas which can be selected. The arrangement of the present embodiment wherein the focus detecting ares which can be selected and the selected focus detecting area are displayed in different modes, however, allows the photographer to smoothly and reliably perform the selecting operation of the areas. In addition, the focus detecting areas which can be selected and the selected focus detecting area, that is, the area made effective for focus detection in practice are displayed differently, so that the photographer is allowed to start photographing after acknowledging the displays indicating the effective area in the finder, resulting in prevention of malfunction of the camera. Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus having a plurality of functions, comprising:

a selector, said selector is operated for selecting one of the functions;

a manually operable member, said manually operable member is operated for changing data with respect to the selected function;

a finder having a finder screen through which an object image is viewed; and a display which displays a function mark representing the selected function within the periphery of the finder screen.

2. An apparatus as claimed in claim 1, wherein the display displays another mark corresponding in appearance with the manually operable member next to the function mark on the finder screen.

3. An apparatus as claimed in claim 1, further comprising an image exposing device, and wherein the functions include an exposure compensation function, and an exposure compensation amount is changed by operating the manually operable member when the exposure compensation function is selected by the selector.

4. An apparatus as claimed in claim 1, further comprising an image exposing device which exposes an object image on a film, and wherein the functions include a film speed changing function, and a film speed is changed by operating the manually operable member when the film speed changing function is selected by the selector.

5. An apparatus as claimed in claim 1, further comprising an object lens and an autofocus device which has a plurality of focus detection areas and drives the object lens based on outputs from the focus detection areas, and wherein the functions include a focus detection area selecting function, and the focus detection area is changed by operating the manually operable member when the focus detection area selecting function is selected.

6. An apparatus as claimed in claim 1, further comprising an image exposing device, and the functions include an exposing mode changing function, and an exposing mode is changed by operating the manually operable member when the exposing mode changing function is selected.

7. An apparatus as claimed in claim 1, wherein the display further displays the data changed by operating the manually operable member on the finder screen.

8. An apparatus as claimed in claim 1, further comprising another display which displays the data changed by operating the manually operable member outside of the finder screen.

9. An apparatus as claimed in claim 1, wherein the display causes the disappearance of a function mark representing a non-selection function with the remaining function mark representing the selection function.

10. An apparatus as claimed in claim 1, wherein the display displays a function mark representing a non-selected function with a form different from the function mark representing the selected function.

11. An apparatus as claimed in claim 1, wherein the finder is an optical finder, and the display includes a transparent liquid display arranged in a part of a light path of the finder.

12. An apparatus as claimed in claim 1, wherein the selector selects two functions simultaneously and the manually operable member changes data with respect to the selected two functions.

13. An apparatus as claimed in claim 12, wherein the manually operable member has two switches one of which changes data with respect to the one function and other of which changes data with respect to the other function.

14. An apparatus having a plurality of functions, comprising:

a selector, said selector is operated for selecting one of the functions;

a manually operable member, said manually operable member is operated for changing data with respect to the selected function;

a display which displays first and second marks with a predetermined relationship therebetween, said first mark corresponding in appearance with the manually operable member, and said second mark representing the selected function; and a finder through which the first and second marks on the display are viewed.

15. An apparatus as claimed in claim 14, further comprising an image exposing device, and wherein the functions include an exposure compensation function, and an exposure compensation amount is changed by operating the manually operable member when the exposure compensation function is selected by the selector.

16. An apparatus as claimed in claim 14, further comprising an image exposing device which exposes an object image on a film, and wherein the functions include a film speed changing function, and a film speed is changed by operating the manually operable member when the film speed changing function is selected by the selector.

17. An apparatus as claimed in claim 14, further comprising an object lens and an autofocus device which has a plurality of focus detection areas and drives the object lens based on outputs from the focus detection areas, and wherein the functions include a focus detection area selecting function, and the focus detection area is changed by operating the manually operable member when the focus detection area selecting function is selected.

18. An apparatus as claimed in claim 14, further comprising an image exposing device, and wherein the functions include an exposing mode changing function, and an exposing mode is changed by operating the manually operable member when the exposing mode changing function is selected.

19. An apparatus as claimed in claim 14, wherein the display further displays the data changed by operating the manually operable member on a finder screen.

20. An apparatus as claimed in claim 14, wherein the display further displays the data changed by operating the manually operable member outside a finder screen.

21. An apparatus as claimed in claim 14, wherein the display causes the disappearance of a mark representing a non-selected function with the remaining mark representing the selected function.

22. An apparatus as claimed in claim 14, wherein the display displays a mark representing a non-selected function with a form different from the mark representing the selected function.

23. An apparatus as claimed in claim 14, wherein the finder is an optical finder, and the display includes a transparent liquid display arranged in a part of a light path of the finder.

24. An apparatus as claimed in claim 14, wherein the selector selects two functions simultaneously and the manually operable member changes data with respect to the selected two functions.

25. An apparatus as claimed in claim 24, wherein the manually operable member has two switches one of which changes data with respect to the one function and other of which changes data with respect to the other function.

* * * * *